(12) United States Patent
Hirose et al.

(10) Patent No.: US 8,852,802 B2
(45) Date of Patent: Oct. 7, 2014

(54) ANODE ACTIVE MATERIAL, ANODE, AND BATTERY

(75) Inventors: Takakazu Hirose, Fukushima (JP); Takayuki Fujii, Fukushima (JP); Kazunori Noguchi, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 1275 days.

(21) Appl. No.: 12/261,549

(22) Filed: Oct. 30, 2008

(65) Prior Publication Data

US 2009/0111031 A1    Apr. 30, 2009

(30) Foreign Application Priority Data

Oct. 31, 2007    (JP) .................................. 2007-283081

(51) Int. Cl.
| | | |
|---|---|---|
| H01M 4/62 | (2006.01) | |
| H01M 10/0568 | (2010.01) | |
| H01M 10/052 | (2010.01) | |
| H01M 4/134 | (2010.01) | |
| H01M 4/38 | (2006.01) | |
| H01M 10/0569 | (2010.01) | |
| H01M 4/64 | (2006.01) | |
| H01M 4/02 | (2006.01) | |

(52) U.S. Cl.
CPC ............. *H01M 4/38* (2013.01); *H01M 10/0568* (2013.01); *Y02E 60/122* (2013.01); *H01M 4/64* (2013.01); *H01M 4/625* (2013.01); *H01M 2004/021* (2013.01); *H01M 10/052* (2013.01); *H01M 4/622* (2013.01); *H01M 4/134* (2013.01); *H01M 10/0569* (2013.01)
USPC ....................................................... 429/218.1

(58) Field of Classification Search
USPC ....................................................... 429/218.1
See application file for complete search history.

(56) References Cited

U.S. PATENT DOCUMENTS

| | | | |
|---|---|---|---|
| 2007/0020523 A1* | 1/2007 | Kawase et al. ............. | 429/218.1 |
| 2007/0072078 A1* | 3/2007 | Hirose et al. ............... | 429/218.1 |
| 2007/0105017 A1* | 5/2007 | Kawase et al. ............. | 429/218.1 |
| 2010/0233534 A1* | 9/2010 | Iwama et al. ................. | 429/209 |

FOREIGN PATENT DOCUMENTS

| | | |
|---|---|---|
| JP | 2002-083594 | 3/2002 |
| JP | 2003-272613 | 9/2003 |
| JP | 2004-071542 | 3/2004 |
| JP | 2004-259475 | 9/2004 |
| JP | 2004-349057 | 9/2004 |
| JP | 2004-335195 | 11/2004 |
| JP | 2004-349057 | 12/2004 |
| JP | 2005-235589 | 9/2005 |
| JP | 2007-027008 | 2/2007 |
| JP | 2007-242405 | 9/2007 |

OTHER PUBLICATIONS

Japanese Office Action dated Jan. 23, 2013 issued in connection with counterpart Japanese Patent Application No. 2007-283081.

* cited by examiner

*Primary Examiner* — Ula C Ruddock
*Assistant Examiner* — Frank Chernow
(74) *Attorney, Agent, or Firm* — Dentons US LLP

(57) ABSTRACT

A battery capable of improving the cycle characteristics is provided. The battery includes a cathode, an anode, and an electrolytic solution. The anode has an anode active material layer that contains an anode active material containing silicon on an anode current collector, and intensity ratio I1/I2 between peak intensity I1 originated in (220) crystalline plane of silicon obtained by X-ray diffraction and peak intensity I2 originated in (111) crystalline plane of silicon obtained by X-ray diffraction is 0.05 or more.

29 Claims, 14 Drawing Sheets

ANODE BINDER : POLYIMIDE

ANODE BINDER : POLYIMIDE

ANODE BINDER : POLYAMIDE

ANODE BINDER : POLYAMIDEIMIDE

ANODE BINDER : POLYVINYLIDENE FLUORIDE

ANODE BINDER : POLYIMIDE

ANODE ACTIVE MATERIAL, ANODE, AND BATTERY

CROSS REFERENCES TO RELATED APPLICATIONS

The present invention contains subject matter related to Japanese Patent Application JP 2007-283081 filed in the Japanese Patent Office on Oct. 31, 2007, the entire contents of which being incorporated herein by reference.

BACKGROUND OF THE INVENTION

1. Field of the Invention

The present invention relates to an anode active material containing silicon, an anode using it, and a battery using it.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery can provide a higher energy density compared to a lead battery and a nickel cadmium battery. The lithium ion secondary battery has a cathode, an anode, and an electrolytic solution. The anode has an anode active material layer on an anode current collector.

As an anode active material contained in the anode active material layer, a carbon material such as graphite has been widely used. In recent years, as the high performance and the multi functions of the portable electronic devices are developed, further improvement of the battery capacity is demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved.

However, when silicon having the high theoretical capacity is used as an anode active material, the anode active material inserting lithium when charged is highly activated. Thus, the electrolytic solution is easily decomposed, and lithium is easily inactivated. Further, since the anode active material inserting lithium is significantly expanded and shrunk, the anode active material layer is easily dropped. Accordingly, though a high capacity is obtained, sufficient cycle characteristics are hardly obtained.

Therefore, to improve the cycle characteristics as well when silicon is used as the anode active material, it is suggested to control the crystal state of silicon. Specifically, a technique that the peak intensity ratio based on Raman spectroscopic analysis (in the vicinity of 480 cm$^{-1}$/in the vicinity of 520 cm$^{-1}$) is set to 0.05 or more has been known (for example, refer to Japanese Unexamined Patent Application Publication No. 2002-083594). Further, a technique that the surface of silicon particles are covered with non-graphitic carbon material, and the peak intensity ratio of silicon to carbon based on X ray Electron Spectroscopy for Chemical Analysis (ESCA) is set to in the range from 0 to 0.2 has been known (for example, refer to Japanese Unexamined Patent Application Publication No. 2004-259475).

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics tend to be easily lowered. Therefore, further improvement of the cycle characteristics of the secondary battery has been aspired.

In view of the foregoing, in the invention, it is desirable to provide an anode active material, an anode, and a battery capable of improving the cycle characteristics.

According to an embodiment of the invention, there is provided an anode active material containing silicon, wherein intensity ratio I1/I2 between peak intensity I1 originated in (220) crystalline plane of silicon obtained by X-ray diffraction and peak intensity I2 originated in (111) crystalline plane of silicon obtained by X-ray diffraction is 0.05 or more.

According to an embodiment of the invention, there is provided an anode including an anode active material layer that contains an anode active material containing silicon on an anode current collector, wherein intensity ratio I1/I2 between peak intensity I1 originated in (220) crystalline plane of silicon obtained by X-ray diffraction and peak intensity I2 originated in (111) crystalline plane of silicon obtained by X-ray diffraction is 0.05 or more.

According to an embodiment of the invention, there is provided a battery including a cathode, an anode, and an electrolytic solution, wherein the anode has an anode active material layer that contains an anode active material containing silicon on an anode current collector, and intensity ratio I1/I2 between peak intensity I1 originated in (220) crystalline plane of silicon obtained by X-ray diffraction and peak intensity I2 originated in (111) crystalline plane of silicon obtained by X-ray diffraction is 0.05 or more.

According to the anode active material of the embodiment of the invention, the intensity ratio I1/I2 between the peak intensity I1 originated in (220) crystalline plane of silicon obtained by X-ray diffraction and the peak intensity I2 originated in (111) crystalline plane of silicon obtained by X-ray diffraction is 0.05 or more. Thus, the ratio of stable crystalline plane (everywhere-dense plane) as a crystalline plane of silicon is increased, and the crystalline state becomes appropriate. Therefore, according to the anode or the battery using the anode active material of the embodiment of the invention, in electrode reaction, the anode active material layer is hardly dropped, a stable coat is easily formed on the surface of the anode, and the anode active material is hardly reacted. As a result, the cycle characteristics can be improved.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
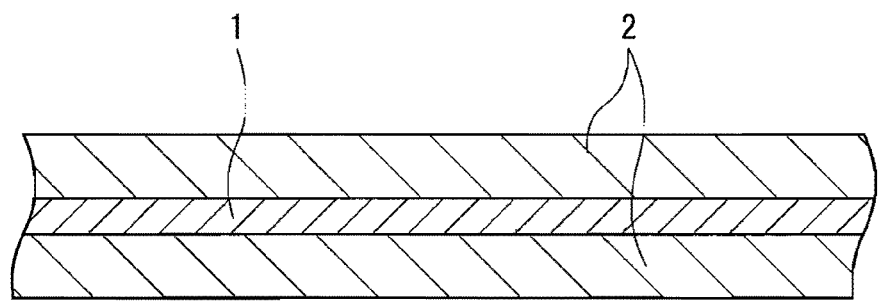
FIG. 1 is a cross section view showing a structure of an anode using an anode active material according to an embodiment of the invention.

FIG. 1 shows a cross sectional structure of an anode using an anode active material according to an embodiment of the invention. The anode is used, for example, for an electrochemical device such as a battery. The anode has an anode current collector 1 having a pair of faces and an anode active material layer 2 provided on the anode current collector 1. The anode active material layer 2 may be provided on the both faces of the anode current collector 1, or may be provided on only a single face thereof.

The anode current collector 1 is preferably made of a metal material having favorable electrochemical stability, favorable electric conductivity, and favorable mechanical strength. As such a metal material, for example, copper (Cu), nickel (Ni), stainless or the like is cited. Specially, copper is preferable since a high electric conductivity can be thereby obtained.

In particular, the foregoing metal material preferably contains one or more metal elements not forming an intermetallic compound with an electrode reactant. When the intermetallic compound is formed with the electrode reactant, lowering of the current collectivity characteristics and separation of the anode active material layer 2 from the anode current collector 1 may occur, being affected by a stress due to expansion and shrinkage of the anode active material layer 2 while the electrochemical device is operated (for example, when a battery is charged and discharged). As the foregoing metal element, for example, copper, nickel, titanium (Ti), iron (Fe), chromium (Cr) or the like is cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is hardly separated from the anode current collector 1. As a metal element that does not form an intermetallic compound with the electrode reactant and is alloyed with the anode active material layer 2, for example, in the case that the anode active material layer 2 contains silicon as an anode active material, copper, nickel, iron or the like is cited. These metal elements are preferable in view of the strength and the electric conductivity as well.

The anode current collector 1 may have a single layer structure or a multilayer structure. In the case where the anode current collector 1 has the multilayer structure, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 in the region opposed to the anode active material layer 2 is roughened. As a roughening method, for example, a method of forming fine particles by electrolytic treatment and the like are cited. The electrolytic treatment is a method of providing concavity and convexity by forming fine particles on the surface of the anode current collector 1 by electrolytic method in an electrolytic bath. A copper foil provided with the electrolytic treatment is generally called "electrolytic copper foil."

Arithmetic average roughness Ra of the surface of the anode current collector 1 is not particularly limited, but is preferably 0.2 µm or more, since thereby the contact characteristics between the anode current collector 1 and the anode active material layer 2 are further improved. The arithmetic average roughness Ra is preferably 0.4 µm or less. If the arithmetic average roughness Ra is larger than 0.4 µm, the surface irregularity of the anode current collector 1 is excessively large, and thus there is a possibility that the anode active material layer 2 is not stably formed on the anode current collector 1, and there is a possibility that many holes are included in the anode active material layer 2 and thereby the surface area is excessively increased.

The anode active material layer 2 contains, as an anode active material, a material capable of inserting and extracting an electrode reactant. The anode active material contains silicon, since silicon has a high ability to insert and extract the electrode reactant, and thus can provide a high energy density. As the anode active material, any of the simple substance, an alloy, and a compound of silicon may be used, or a material having one or more phases thereof at least in part may be used.

In the invention, "the alloy" includes an alloy containing one or more metal elements and one or more metalloid elements, in addition to an alloy composed of two or more metal elements. Further, "the alloy" may contain a nonmetallic element. The structure thereof includes a solid solution, a eutectic crystal (eutectic mixture), an intermetallic compound, and a structure in which two or more thereof coexist.

As the alloy of silicon, for example, an alloy containing at least one selected from the group consisting of tin (Sn), nickel, copper, iron, cobalt (Co), manganese (Mn), zinc (Zn), indium (In), silver (Ag), titanium, germanium (Ge), bismuth (Be), antimony (Sb), and chromium as an element other than silicon is cited.

As the compound of silicon, for example, a compound containing oxygen (O) and carbon (C) as an element other than silicon is cited. The compound of silicon may have, for example, as an element other than silicon, one or more of the series of elements described for the alloy of silicon.

Examples of an alloy or a compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), LiSiO and the like are cited.

For the crystalline state of silicon contained in the anode active material, the intensity ratio I1/I2 between peak intensity I1 originated in (220) crystalline plane of silicon obtained by X-ray diffraction and peak intensity I2 originated in (111) crystalline plane of silicon obtained by X-ray diffraction is 0.05 or more. Thereby, the ratio of stable crystalline plane (everywhere-dense plane) as a crystalline plane of silicon is increased, and the crystalline state becomes appropriate. Accordingly, defects such as a crack are hardly generated in the anode active material in electrode reaction. As a result, the anode active material layer 2 is hardly dropped, and a coat such as an Solid Electrolyte Interface (SEI) film is easily formed stably on the surface of the anode. Further, since the chemical stability of the anode active material is improved, the anode active material is hardly reacted with other material (for example, an electrolytic solution in the case that the anode is used for a battery). The peak originated in (220) crystalline plane is a peak generated where $2\theta$ is 4.7664 deg±1 deg. The peak originated in (111) crystalline plane is a peak generated where $2\theta$ is 28.651 deg±1 deg.

In particular, the intensity ratio I1/I2 is preferably in the range from 0.2 to 1. Thereby, the crystalline state of silicon becomes more appropriate, and higher effects are obtained.

The anode active material is, for example, composed of a plurality of particles. In this case, the average particle diameter of the anode active material particles (so-called median size) is preferably in the range from 0.1 μm to 30 μm, and more preferably in the range from 1 μm to 20 μm. Thereby, when the intensity ratio I1/I2 is in the foregoing range, the particle size distribution of the anode active material particles becomes appropriate, and thus hither effects are obtained. More specifically, if the median size is larger than 30 μm, the binding characteristics of the anode active material are lowered, and thus the anode active material layer 2 may be easily dropped. Meanwhile, if the median size is smaller than 0.1 μm, the surface area of the anode active material may be excessively increased.

The surface color (brightness) of the anode, that is, the surface color of the anode viewed from the anode active material layer 2 side depends on the amount of voids included in the anode active material layer 2. More specifically, if the amount of voids is small, the anode active material densely exists and the reflectivity is high, and thus the surface color is changed to white direction. Meanwhile, if the amount of voids is large, the anode active material exists in a nondense fashion and the reflectivity is low, and thus the surface color is changed to black direction.

The surface color of the anode is preferably in the range from 8.5 to 75.5, and more preferably in the range from 30 to 60 in L* indication based on L*a*b* color coordinate system specified in JIS Z 8729. Thereby, when the intensity ratio I1/I2 is in the foregoing range, the amount of voids included in the anode active material layer 2 becomes appropriate, and thus the chemical stability of the anode is improved. More specifically, if the amount of voids is small, a space to relax a stress is not sufficient when the anode active material layer 2 is expanded and shrunk in electrode reaction, and thus the anode active material layer 2 may be easily dropped. Meanwhile, if the amount of voids is large, the surface area of the anode active material 2 is increased, and thus the chemical stability of the anode may be lowered.

For the crystalline state of the anode active material in this case, where in the measurement range of 20 deg$\leq 2\theta \leq$90 deg, a sum of the peak intensity I1 originated in (220) crystalline plane of silicon obtained by X-ray diffraction and the peak intensity I2 originated in (111) crystalline plane of silicon obtained by X-ray diffraction is A, and a sum of peak intensities originated in crystalline planes other than (220) crystalline plane and (111) crystalline plane is B, the intensity ratio A/B is preferably 1 or more, and more preferably 1.5 or more. Thereby, the crystalline state of the anode active material becomes appropriate, and higher effects are obtained.

The anode active material may contain other material capable of inserting and extracting the electrode reactant in addition to silicon. As such a material, for example, a material that can insert and extract the electrode reactant and contains at least one of metal elements and metalloid elements as an element (except for silicon) is cited. Such a material is preferably used, since a high energy density can be thereby obtained. Such a material may be a simple substance, an alloy, or a compound of a metal element or a metalloid element, or may have one or more phases thereof at least in part.

As such a metal element or such a metalloid element, for example, a metal element or a metalloid element capable of forming an alloy with the electrode reactant is cited. Specifically, magnesium (Mg), boron, aluminum, gallium (Ga), indium, germanium, tin, lead (Pb), bismuth, cadmium (Cd), silver, zinc, hafnium (Hf), zirconium (Zr), yttrium (Y), palladium (Pd), platinum (Pt) and the like are cited. Specially, tin is preferably used, since tin has the high ability to insert and extract the electrode reactant, and thus can provide a high energy density. As a material containing tin, for example, the simple substance, an alloy, or a compound of tin, or a material containing at least one or more phases thereof at least in part is cited.

As the alloy of tin, for example, an alloy containing at least one selected from the group consisting of silicon, nickel, copper, iron, cobalt, manganese, zinc, indium, silver, titanium, germanium, bismuth, antimony, and chromium as an element other than tin is cited. As the compound of tin, for example, a compound containing oxygen or carbon as an element other than tin is cited. The compound of tin may contain one or more of the series of the elements described for the alloy of tin as an element other than silicon. Examples of the alloy or the compound of tin include $SnSiO_3$, LiSnO, $Mg_2Sn$ and the like.

In particular, as the material containing tin, for example, a material containing the second element and the third element in addition to tin as the first element is preferable. As the second element, at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon is cited. As the third element, at least one selected from the group consisting of boron, carbon, aluminum, and phosphorus (P) is cited. If the second element and the third element are contained, the cycle characteristics are improved.

Specially, a SnCoC-containing material that has tin, cobalt, and carbon as an element in which the carbon content is in the range from 9.9 wt % to 29.7 wt %, and the cobalt ratio to the total of tin and cobalt (Co/(Sn+Co)) is in the range from 30 wt % to 70 wt % is preferable. In such a composition range, a high energy density is cited.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effects are obtained.

The SnCoC-containing material has a phase containing tin, cobalt, and carbon. Such a phase preferably has a low crystalline structure or a amorphous structure. Further, in the SnCoC-containing material, at least part of carbon as an element is preferably bonded to a metal element or a metalloid element as other element. Cohesion or crystallization of tin or the like is thereby prevented.

The SnCoC-containing material can be formed by, for example, mixing raw materials of each element, dissolving the resultant mixture in an electric furnace, a high frequency induction furnace, an arc melting furnace or the like and then solidifying the resultant. Otherwise, the SnCoC-containing material can be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material can have a low crystalline structure or an amorphous structure. For the method using the mechanochemical reaction, for example, a manufacturing apparatus such as a planetary ball mill apparatus and an attliter is used.

As a measurement method for examining bonding state of elements, for example, X-ray Photoelectron Spectroscopy (XPS) is cited. In XPS, in the case of graphite, the peak of Is orbit of carbon (C1s) is observed at 284.5 eV in the apparatus in which energy calibration is made so that the peak of 4f orbit of gold atom (Au4f) is obtained at 84.0 eV. In the case of surface contamination carbon, the peak is observed at 284.8 eV. Meanwhile, in the case of higher electric charge density of carbon element, for example, in the case where carbon is bonded to a metal element or a metalloid element, the peak of C1s is observed in the region lower than 284.5 eV. That is, in the case where the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the SnCoC-containing material. Therefore, for example, by analyzing the waveform with the use of commercially available software, the peak of the surface contamination carbon and the peak of carbon in the SnCoC-containing material are separated. In the analysis of the waveform, the position of the main peak existing on the lowest bound energy side is set to the energy reference (284.8 eV).

As other material capable of inserting and extracting the electrode reactant, for example, a carbon material is cited. As the carbon material, for example, graphitizable carbon, non-graphitizable carbon in which the spacing of (002) plane is 0.37 nm or more, graphite in which the spacing of (002) plane is 0.34 nm or less and the like are cited. More specifically, pyrolytic carbons, coke, glassy carbon fiber, an organic polymer compound fired body, activated carbon, carbon black or the like is cited. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, the crystal structure change associated with insertion and extraction of the electrode reactant is very little. Therefore, by using the carbon material, a high energy density is obtained, and the carbon material also functions as an electrical conductor, and thus the carbon material is preferably used. The shape of the carbon material may be any of a fibrous shape, a spherical shape, a granular shape, and a scale-like shape.

Further, as other material capable of inserting and extracting the electrode reactant, for example, a metal oxide, a polymer compound and the like capable of inserting and extracting the electrode reactant are cited. As the metal oxide, for example, iron oxide, ruthenium oxide, molybdenum oxide or the like is cited. As the polymer compound, for example, polyacetylene, polyaniline, polypyrrole or the like is cited.

It is needless to say that as other material capable of inserting and extracting the electrode reactant, a material other than the foregoing may be used. Further, given two or more of the foregoing series of materials capable of inserting and extracting the electrode reactant may be used by mixture.

The anode active material layer 2 containing silicon as an anode material is formed by, for example, vapor-phase deposition method, liquid-phase deposition method, spraying method, coating method, firing method, or a combination of two or more of these methods. In this case, the anode current collector 1 and the anode active material layer 2 are preferably alloyed in at least part of the interface thereof. Specifically, at the interface thereof, the element of the anode current collector 1 may be diffused in the anode active material layer 2; or the element of the anode active material layer 2 may be diffused in the anode current collector 1; or these elements may be diffused in each other. Thereby, destruction due to expansion and shrinkage of the anode active material layer 2 in electrode reaction is prevented, and the electron conductivity between the anode current collector 1 and the anode active material layer 2 is improved.

As vapor-phase deposition method, for example, physical deposition method or chemical deposition method is cited. Specifically, vacuum evaporation method, sputtering method, ion plating method, laser ablation method, thermal CVD (Chemical Vapor Deposition) method, plasma CVD method and the like are cited. As liquid-phase deposition method, a known technique such as electrolytic plating and electroless plating is used. Coating method is, for example, a method in which a particulate anode active material mixed with a binder or the like is dispersed in a solvent and the anode current collector is coated with the resultant. Firing method is, for example, a method in which the anode current collector is coated by using coating method, and then heat treatment is provided at a temperature higher than the melting point of the binder or the like. For firing method, a known technique such as atmosphere firing method, reactive firing method, and hot press firing method is available as well.

The anode active material layer 2 may contain other material such as an anode binder and an anode electrical conductor according to needs in addition to the anode active material.

As the anode binder, for example, a synthetic rubber such as styrene-butadiene rubber, fluorinated rubber, and ethylene propylene diene; or a polymer material such as polyimide, polyamide, polyamideimide, and polyvinylidene fluoride is cited. One thereof may be used singly, or a plurality thereof may be used by mixture.

Specially, at least one resin selected from the group consisting of polyimide, polyamide, and polyamideimide is preferable, since such a resin has superior heat resistance. In this case, at least part of the resin is preferably carbonized, since a carbide functions as an electrical conductor. To carbonize the resin, for example, when the anode active material layer 2 is formed by firing method, heat treatment is provided at a temperature higher than the kick-off temperature of the resin. The heat treatment temperature can be voluntarily set according to conditions such as the kick-off temperature of the resin and carbonization degree. However, when the heat treatment temperature is excessively high, the anode current collector 1 may be deformed to be broken. Thus, the heat treatment temperature is preferably lower than the temperature at which the current collector 1 is deformed.

As the anode electrical conductor, for example, a carbon material such as graphite, carbon black, acetylene black, and Ketjen black is cited. Such a carbon material may be used singly, or a plurality thereof may be used by mixture. The anode electrical conductor may be a metal material, a conductive polymer or the like as long as the material has the electric conductivity.

The anode is formed, for example, by the following procedure.

First, the anode active material containing silicon is prepared together with the anode current collector 1 made of an electrolytic copper foil or the like. When the anode active material is prepared, the intensity ratio I1/I2 between the peak intensity I1 originated in (220) crystalline plane of silicon obtained by X-ray diffraction and the peak intensity I2 originated in (111) crystalline plane of silicon obtained by X-ray diffraction is set to 0.05 or more. Subsequently, the anode active material containing silicon, the anode binder, and the anode electrical conductor are mixed to prepare an anode mixture, which is dispersed in a solvent to obtain anode mixture slurry. Subsequently, the surface of the anode current collector 1 is uniformly coated with the anode mixture slurry by a doctor blade, a bar coater or the like, which is dried. Finally, the coating is compression-molded by a rolling press machine or the like. Finally, the coating is provided with heat treatment in the vacuum atmosphere to form the anode active material layer 2. When the anode active material layer 2 is formed, it is preferable that the coating is heated at a temperature higher than the kick-off temperature of a material used as an anode binder, and part thereof is carbonized. Accordingly, the anode is completed.

The foregoing intensity ratio I1/I2 can be set to be a desired value, for example, as follows. In the case where the anode active material containing silicon is prepared, silicon is deposited on the roughned surface of a copper foil (for example, an electrolytic copper foil) by vapor-phase deposition method such as evaporation method, sputtering method, and CVD method, the copper foil is dissolved and removed with the use of nitric acid, and a silicon film is left. The silicon film is pulverized by ball mill into a particle state. Then, the crystalline state of silicon can be controlled by changing the roughness degree (surface roughness) of the copper foil, changing the substrate temperature, the deposition rate, the distance between the deposition source (for example, a crucible in evaporation method) and the copper foil, or the vacuum degree in depositing silicon, or firing the pulverized silicon particles in the reduced pressure atmosphere. Thus, the intensity ratio I1/I2 can be set to be a desired value.

According to the anode using the anode active material, the intensity ratio I1/I2 between the peak intensity I1 originated in (220) crystalline plane of silicon obtained by X-ray diffraction and the peak intensity I2 originated in (111) crystalline plane of silicon obtained by X-ray diffraction is set to 0.05 or more. Thus, the ratio of stable crystalline plane (everywhere-dense plane) as a crystalline plane of silicon is increased, and the crystalline state becomes appropriate. Thereby, in electrode reaction, the anode active material layer 2 is hardly dropped, a stable coat is easily formed on the surface of the anode, and the anode active material is hardly reacted. Therefore, the anode contributes to improvement of the cycle characteristics of the electrochemical device using the anode. In this case, if the intensity ratio I1/I2 is in the range from 0.2 to 1, higher effects are obtained.

In particular, when the anode active material containing silicon is composed of a plurality of particles, the median size is in the range from 0.1 μm to 30 μm, and more preferably in the range from 1 μm to 20 μm, higher effects are obtained.

Further, when the surface color of the anode is in the range from 8.5 to 75.5, or in the range from 30 to 60 in L* indication, higher effects are obtained. In this case, when in the measurement range of 20 deg≤2θ≤90 deg, the intensity ratio A/B between the sum A of the peak intensity I1 originated in (220) crystalline plane of silicon and the peak intensity I2 originated in (111) crystalline plane of silicon, and the sum B of peak intensities originated in the other crystalline planes is 1 or more, or 1.5 or more, higher effects are obtained.

Further, when the anode active material layer 2 contains at least one resin selected from the group consisting of polyimide, polyamide, and polyamideimide as an anode binder, higher effects are obtained. In this case, when at least part of the resin is carbonized, higher effects are obtained.

Further, when the arithmetic average roughness Ra of the surface of the anode current collector 1 is 0.2 μm or more, higher effects are obtained.

Next, a description will be given of usage examples of the foregoing anode. A battery will be described as an example of an electrochemical device. The anode is used for the battery as follows.

First battery

Figure 2:
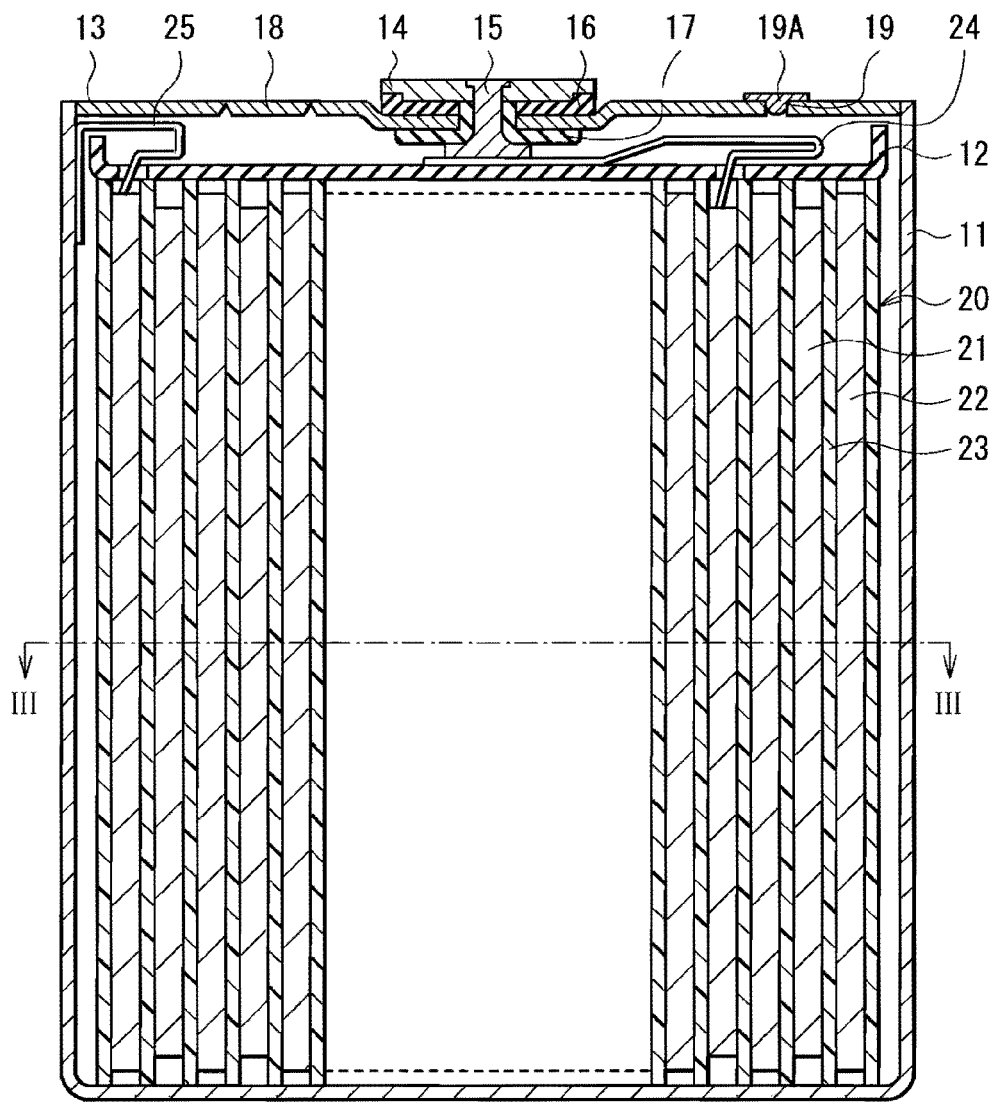
FIG. 2 is a cross section view showing a structure of a first battery including the anode according to the embodiment of the invention.
Figure 3:
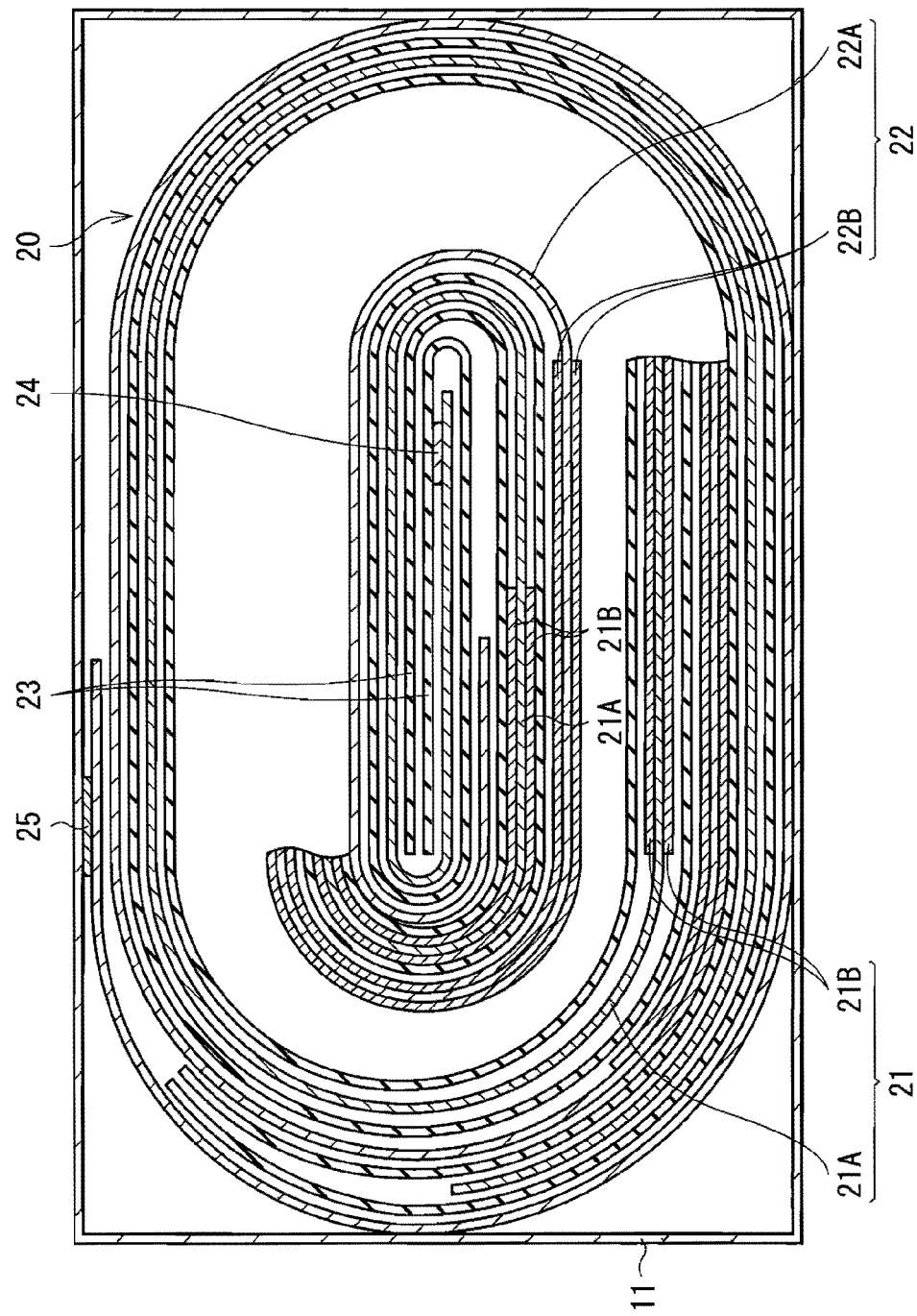
FIG. 3 is a cross section view taken along line III-III of the first battery shown in FIG. 2.

FIG. 2 and FIG. 3 show cross sectional structures of a first battery. FIG. 3 shows a cross section taken along line III-III shown in FIG. 2. The battery herein described is, for example, a lithium ion secondary battery in which the capacity of an anode 22 is expressed based on insertion and extraction of lithium as an electrode reactant.

In the secondary battery, a battery element 20 having a flat spirally wound structure is mainly contained in a battery can 11. The battery can 11 is, for example, a square package member. As shown in FIG. 3, the square package member has a shape with the cross section in the longitudinal direction of a rectangle or an approximate rectangle (including curved lines in part). The square package member structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 3 shows a case that the battery can 11 has a rectangular cross sectional shape. The battery structure including the battery can 11 is called square structure.

The battery can 11 is made of, for example, a metal material containing iron, aluminum, or an alloy thereof. The battery can 11 may have a function as an electrode terminal as well. In this case, to prevent the secondary battery from being swollen by using the rigidity (hardly deformable characteristics) of the battery can 11 when charged and discharged, rigid iron is more preferable than aluminum. In the case where the battery can 11 is made of iron, the iron may be plated by nickel or the like, for example.

The battery can 11 has a hollow structure in which one end of the battery can 11 is closed and the other end of the battery can 11 is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and also has a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. If the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless steel ball.

The battery element 20 is formed by layering a cathode 21 and the anode 22 with a separator 23 in between and then spirally winding the resultant laminated body. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on the both faces of a strip-shaped cathode current collector 21A. The cathode active material layer 21B may be provided on the both faces of the cathode current collector 21A or on only a single face of the cathode current collector 21A. The cathode current collector 21A is, for example, made of a metal material such as aluminum, nickel, and stainless. The cathode active material layer 21B contains, as a cathode active material, one or more materials capable of inserting and extracting lithium. The cathode active material layer 21B may contain other material such as a cathode binder and a cathode electrical conductor according to needs. Details of the cathode binder and the cathode electrical conductor are similar to those of the case described for the foregoing anode.

As the material capable of inserting and extracting lithium, for example, a lithium-containing compound is preferable, since thereby a high energy density is obtained. As the lithium-containing compound, for example, a complex oxide containing lithium and a transition metal element or a phosphate compound containing lithium and a transition metal element is cited. In particular, a compound containing at least one selected from the group consisting of cobalt, nickel, manganese, and iron as a transition metal element is preferable, since thereby a higher voltage is obtained. The chemical formula thereof is expressed as, for example, $Li_xM1O_2$ or $Li_yM2PO_4$. In the formula, M1 and M2 represent one or more transition metal elements. Values of x and y vary according to the charge and discharge state of the battery, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) or the like is cited. Specially, a complex oxide containing cobalt is preferable, since thereby a high capacity is obtained and superior cycle characteristics are obtained. As the phosphate compound containing lithium and a transition metal element, for example, lithium iron phosphate compound ($LiFePO_4$), a lithium iron manganese phosphate compound ($LiFe_{1-u}Mn_uPO_4$ (u<1)) or the like is cited.

In addition, as the material capable of inserting and extracting lithium, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are cited.

The anode 22 has a structure similar to that of the anode described above. For example, in the anode 22, an anode active material layer 22B is provided on the both faces of a strip-shaped anode current collector 22A. The structures of the anode current collector 22A and the anode active material layer 22B are respectively similar to the structures of the anode current collector 1 and the anode active material layer 2 in the anode described above. In the anode 22, the charge capacity of the anode active material capable of inserting and extracting lithium is preferably larger than the charge capacity of the cathode 21.

The maximum utilization ratio (anode utilization ratio) of the anode 22 when fully charged is not particularly limited, but is preferably in the range from 20% to 80%, and more preferably in the range from 30% to 70% by adjusting the ratio of the capacity of the cathode 21 and the capacity of the anode 22, since thereby the cycle characteristics are improved. More specifically, if the anode utilization ratio is smaller than 20%, the initial charge and discharge efficiency may be lowered. Meanwhile, if the anode utilization ratio is larger than 80%, expansion and shrinkage of the anode active material layer 22B in charge and discharge are hardly prevented, and thus the anode active material layer 22B may be dropped.

The foregoing "anode utilization ratio" is expressed as anode utilization ratio (%)=(X/Y)×100 where the lithium insertion amount per unit area of the anode 22 when fully charged is X, and the lithium amount per unit area capable of being electrochemically inserted in the anode 22 is Y.

The insertion amount X is obtained, for example, by the following procedure. First, the secondary battery is charged until fully charge state is obtained. After that, the secondary battery is disassembled, and a portion out of the anode 22 that is opposed to the cathode 21 is cut out as an inspection anode. Subsequently, with the use of the inspection anode, an evaluation battery in which metal lithium is the counter electrode is assembled. Finally, the evaluation battery is discharged, and the discharge capacity in the initial discharge is examined. After that, the discharge capacity is divided by the area of the inspection anode to calculate the insertion amount X. In this case, "discharge" means applying current in the direction in which lithium ions are extracted from the inspection anode.

Meanwhile, the insertion amount Y is obtained, for example, by the following procedure. The foregoing evaluation battery after being discharged is provided with constant current and constant voltage charge until the battery voltage became 0 V to examine the charge capacity. After that, the charge capacity is divided by the area of the inspection anode to calculate the insertion amount Y. In this case, "charge" means applying current in the direction in which lithium ions are inserted into the inspection anode.

The charge and discharge conditions when the foregoing insertion amounts X and Y are obtained are, for example, as follows. For example, discharge is performed until the battery voltage reaches 1.5 V under the current density of 1 mA/cm$^2$, and constant voltage charge is performed until the current value becomes 0.05 mA or less under the battery voltage of 0V.

Figure 4:
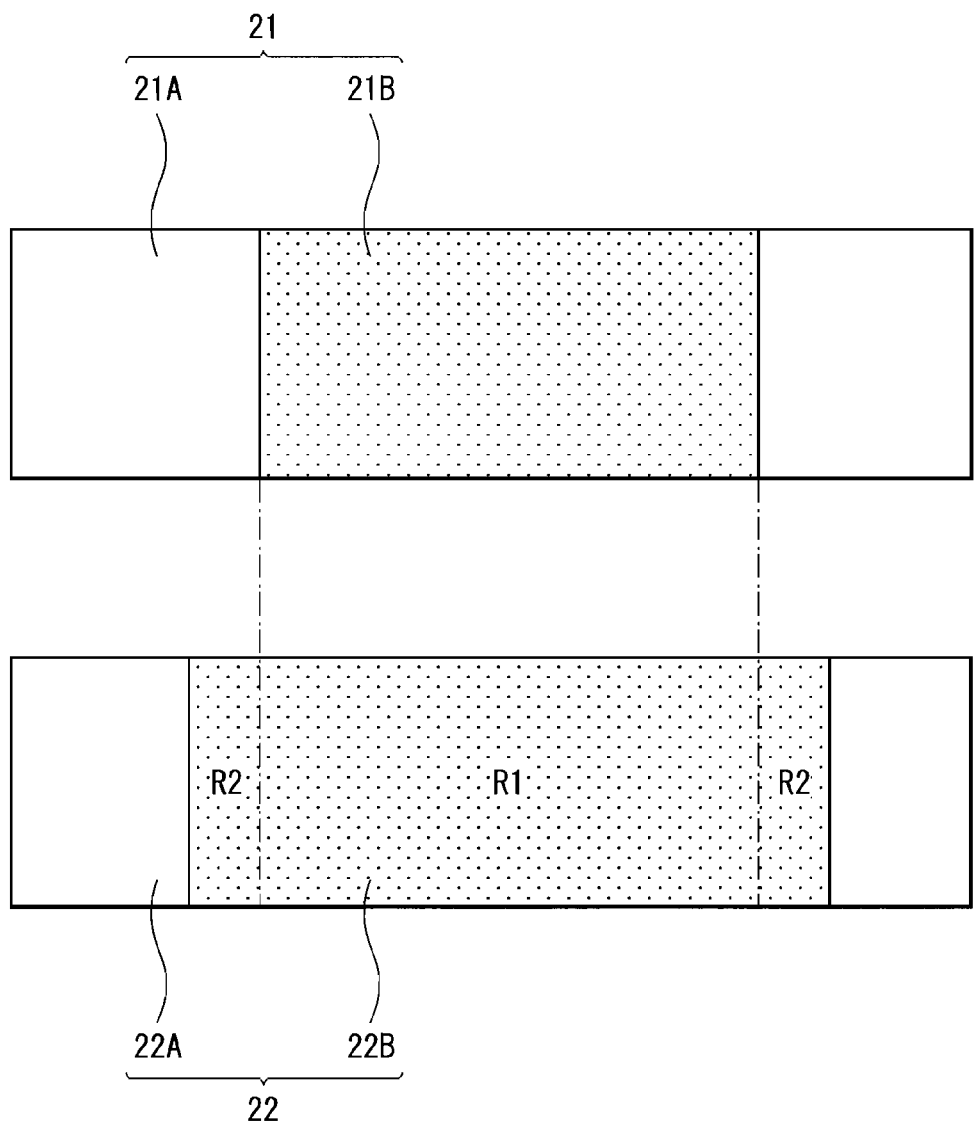
FIG. 4 is a plan view schematically showing a structure of the cathode and the anode shown in FIG. 3.

FIG. 4 schematically shows plane structures of the cathode 21 and the anode 22 shown in FIG. 3. In FIG. 4, formation ranges of the cathode active material layer 21B and the anode active material layer 22B are shaded.

In the secondary battery, for example, the cathode active material layer 21B is partially provided on the cathode current collector 21A, and the anode active material layer 22B is partially provided on the anode current collector 22A. The anode active material layer 22B is opposed to the cathode active material layer 21B, but the formation range of the anode active material layer 22B is larger than the formation range of the cathode active material layer 21B. That is, the anode active material layer 22B is provided with region R1 opposed to the formation region of the cathode active material layer 21B and region R2 not opposed to the formation region of the cathode active material layer 21B. The region R2 is preferably provided on the both sides of the region R1.

In the anode active material layer 22B, a portion provided in the region R1 contributes to charge and discharge, while a portion provided in the region R2 does not contribute to charge and discharge. Thus, in the region R2, the initial state of the anode active material layer 22B (the state immediately after the secondary battery is manufactured) is maintained. Therefore, the crystalline state of silicon contained in the anode active material in the region R2 is maintained without being affected by charge and discharge. Accordingly, the foregoing intensity ratio I1/I2 is preferably obtained in the region R2.

The separator 23 separates the cathode 21 from the anode 22, and passes ions as an electrode reactant while preventing current short circuit due to contact of the both electrodes. The separator 23 is made of, for example, a porous film made of a synthetic resin such as polytetrafluoroethylene, polypropylene, and polyethylene, a ceramic porous film or the like. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester carbonate solvent such as ethylene carbonate, propylene carbonate, butylene carbonate, dimethyl carbonate, diethyl carbonate, ethyl methyl carbonate, and methyl propyl carbonate. Thereby, superior capacity characteristics, superior cycle characteristics, and superior storage characteristics are obtained. Specially, a mixture of a high viscosity solvent such as ethylene carbonate and propylene carbonate and a low viscosity solvent such as dimethyl carbonate, ethyl methyl carbonate, and diethyl carbonate is preferable. Thereby, the dissociation characteristics of the electrolyte salt and the ion mobility are improved, and thus higher effects are obtained.

The solvent preferably contains a cyclic ester carbonate having an unsaturated bond, since thereby the cycle characteristics can be improved. As the cyclic ester carbonate having an unsaturated bond, for example, vinylene carbonate, vinyl ethylene carbonate or the like is cited. One thereof may be used singly, or a plurality thereof may be used by mixture.

The solvent preferably contains at least one of a chain ester carbonate having halogen as an element shown in Chemical formula 1 and a cyclic ester carbonate having halogen as an element shown in Chemical formula 2. Thereby, a stable protective film (coat) is formed on the surface of the anode 22 and decomposition reaction of the electrolytic solution is prevented, and thus the cycle characteristics are improved.

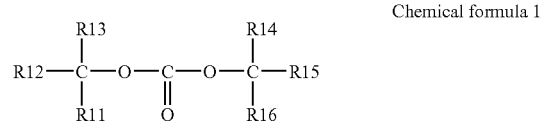

Chemical formula 1

In the formula, R11 to R16 are a hydrogen group, a halogen group, an alkyl group, or an alkyl halide group. At least one of R11 to R16 is the halogen group or the alkyl halide group.

Chemical formula 2

In the formula, R21 to R24 are a hydrogen group, a halogen group, an alkyl group, or an alkyl halide group. At least one of R21 to R24 is the halogen group or the alkyl halide group.

R11 to R16 in Chemical formula 1 may be identical or different. The same is applied to R21 to R24 in Chemical formula 2. "Alkyl halide group" described in R11 to R16 and R21 to R24 is a group obtained by substituting at least partial hydrogen of the alkyl group with halogen. The halogen type is not particularly limited, but for example, at least one selected from the group consisting of fluorine, chlorine, and bromine is cited. Specially, fluorine is preferable, since thereby higher effects are obtained. It is needless to say that other halogen may be used.

The number of halogen is more preferably two than one, and may be three or more, since thereby an ability to form the protective film is improved and more rigid and stable protective film is formed. Accordingly, decomposition reaction of the electrolytic solution is further prevented.

As the chain ester carbonate having halogen shown in Chemical formula 1, for example, fluoromethyl methyl carbonate, difluoromethyl methyl carbonate, bis(fluoromethyl) carbonate or the like is cited. One thereof may be used singly, or a plurality thereof may be used by mixture.

As the cyclic ester carbonate having halogen shown in Chemical formula 2, for example, compounds shown in Chemical formulas 3(1) to 4(9) are cited. That is, 4-fluoro-1,3-dioxolane-2-one of Chemical formula 3(1), 4-chloro-1,3-dioxolane-2-one of Chemical formula 3(2), 4,5-difluoro-1,3-dioxolane-2-one of Chemical formula 3(3), tetrafluoro-1,3-dioxolane-2-one of Chemical formula 3(4), 4-fluoro-5-chloro-1,3-dioxolane-2-one of Chemical formula 3(5), 4,5-dichloro-1,3-dioxolane-2-one of Chemical formula 3(6), tetrachloro-1,3-dioxolane 2-one of Chemical formula 3(7), 4,5-bistrifluoromethyl-1,3-dioxolane 2-one of Chemical formula 3(8), 4-trifuloro methyl-1,3-dioxolane-2-one of Chemical formula 3(9), 4,5-difluoro-4,5-dimethyl-1,3-dioxolane-2-one of Chemical formula 3(10), 4-methyl-5,5-difluoro-1,3-dioxolane-2-one of Chemical formula 3(11), 4-ethyl-5,5-difluoro-1,3-dioxolane-2-one of Chemical formula 3(12) and the like are cited. Further, 4-trifluoromethyl-5-fluoro-1,3-dioxolane-2-one of Chemical formula 4(1), 4-trifluoromethyl-5-methyl-1,3-dioxolane-2-one of Chemical formula 4(2), 4-fluoro-4,5-dimethyl-1,3-dioxolane-2-one of Chemical formula 4(3), 4,4-difluoro-5-(1,1-difluoroethyl)-1,3-dioxolane-2-one of Chemical formula 4(4), 4,5-dichloro-4,5-dimethyl-1,3-dioxolane-2-one of Chemical formula 4(5), 4-ethyl-5-fluoro-1,3-dioxolane-2-one of Chemical formula 4(6), 4-ethyl-4,5-difluoro-1,3-dioxolane-2-one of Chemical formula 4(7), 4-ethyl-4,5,5-trifluoro-1,3-dioxolane-2-one of Chemical formula 4(8), 4-fluoro-4-methyl-1,3-dioxolane-2-one of Chemical formula 4(9) and the like are cited. One thereof may be used singly, or a plurality thereof may be used by mixture.

Chemical formula 3

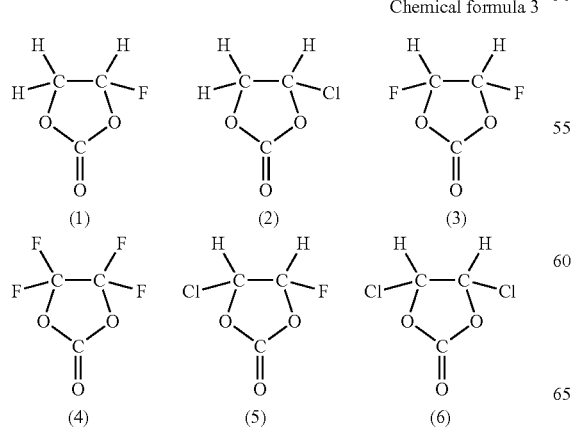

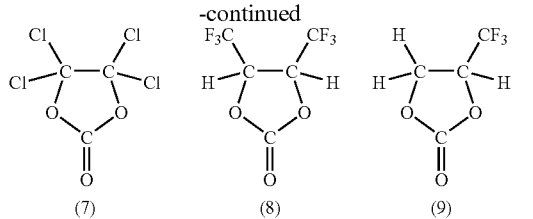

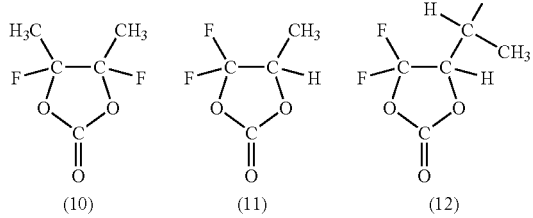

Chemical formula 4

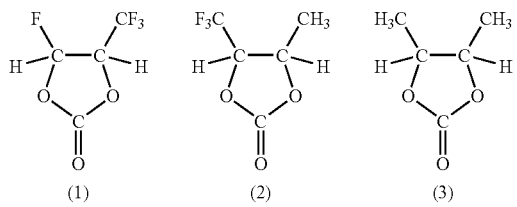

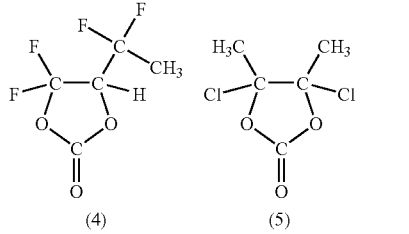

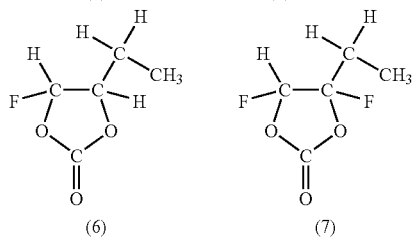

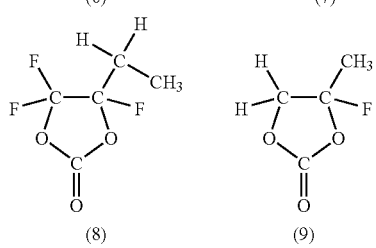

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a sis isomer, since the trans isomer is easily available and provides high effects.

Further, the solvent preferably contains sultone (cyclic ester sulfonate), since thereby the cycle characteristics are improved and swollenness of the secondary battery is prevented. As the sultone, for example, propane sultone, propene sultone or the like is cited. One thereof may be used singly, or a plurality thereof may be used by mixture.

In addition, the solvent preferably contains an acid anhydride, since thereby the cycle characteristics are improved. As the acid anhydride, for example, succinic anhydride, glutaric anhydride, maleic anhydride, sulfobenzoic acid anhydride, sulfo propionic acid anhydride, sulfo butyric acid anhydride, ethane disulfonic acid anhydride, propane disulfonic acid anhydride, benzene disulfonic acid anhydride and the like are cited. One thereof may be used singly, or a plurality thereof may be used by mixture. Specially, sulfo benzoic acid anhydride or sulfo propionic acid anhydride is preferable, since thereby sufficient effects are obtained. The content of the acid anhydride in the solvent is, for example, in the range from 0.5 wt % to 3 wt %.

The electrolyte salt contains, for example, one or more light metal salts such as a lithium salt. As the lithium salt, for example, lithium hexafluorophosphate, lithium tetrafluoroborate, lithium perchlorate, lithium hexafluoroarsenate or the like is cited, since thereby superior capacity characteristics, superior cycle characteristics, and superior storage characteristics are obtained. Specially, lithium hexafluorophosphate is preferable, since the internal resistance is lowered, and thus higher effects are obtained.

The electrolyte salt preferably contains at least one selected from the group consisting of the compounds shown in Chemical formula 5 to Chemical formula 7. Thereby, when such a compound is used together with the foregoing lithium hexafluorophosphate or the like, higher effects are obtained. R31 and R33 in Chemical formula 5 may be identical or different. The same is applied to R41 to R43 in Chemical formula 6 and R51 and R52 in Chemical formula 7.

Chemical formula 5

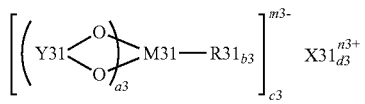

In the formula, X31 is a Group 1A element or a Group 2A element in the short period periodic table or aluminum. M31 is a transition metal, a Group 3B element, a Group 4B element, or a Group 5B element in the short period periodic table. R31 is a halogen group. Y31 is —OC—R32-CO—, —OC—CR33$_2$-, or —OC—CO—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is one of integer numbers 0, 2, and 4. c3, d3, m3, and n3 is one of integer numbers 1 to 3.

Chemical formula 6

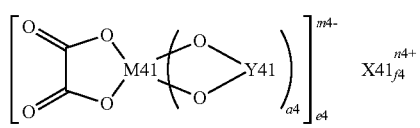

In the formula, X41 is a Group 1A element or a Group 2A element in the short period periodic table. M41 is a transition metal element, a Group 3B element, a Group 4B element, or a Group 5B element in the short period periodic table. Y41 is —OC—(CR41$_2$)$_{b4}$—CO—, —R43$_2$C—(CR42$_2$)$_{c4}$—CO—, —R43$_2$C—(CR42$_2$)$_{c4}$—CR43$_2$-, —R43$_2$C—(CR42$_2$)$_{c4}$—SO$_2$—, —O$_2$S—(CR42$_2$)$_{d4}$—SO$_2$—, or —OC—(CR42$_2$)$_{d4}$—SO$_2$—. R41 and R43 are a hydrogen group, an alkyl group, a halogen group, or an alkyl halide group. At least one of R41/R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 7

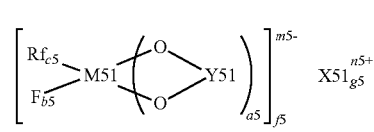

In the formula, X51 is a Group 1A element or a Group 2A element in the short period periodic table. M51 is a transition metal element, a Group 3B element, a Group 4B element, or a Group 5B element in the short period periodic table. Rf is a fluorinated alkyl group with the carbon number in the range from 1 to 10 or a fluorinated aryl group with the carbon number in the range from 1 to 10. Y51 is —OC—(CR51$_2$)$_{d5}$—CO—, —R52$_2$C—(CR51$_2$)$_{d5}$—CO—, —R52$_2$C—(CR51$_2$)$_{d5}$—CR52$_2$—, —R52$_2$C—(CR51$^2$)$_{d5}$—SO$_2$—, —O$_2$S—(CR51$_2$)$_{e5}$—SO$_2$—, or —OC—(CR51$_2$)$_{e5}$—SO$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are an integer number of 1 or 2. b5, c5, and e5 are one of integer numbers 1 to 4. d5 is one of integer numbers 0 to 4. g5 and m5 are one of integer numbers 1 to 3.

As a compound shown in Chemical formula 5, for example, the compounds shown in Chemical formulas 8(1) to 8(6) are cited. As a compound shown in Chemical formula 6, for example, the compounds shown in Chemical formulas 9(1) to 9(8) are cited. As a compound shown in Chemical formula 7, for example, the compound shown in Chemical formula 10 or the like is cited. It is needless to say that the compound is not limited to the compounds shown in Chemical formula 8(1) to Chemical formula 10, and the compound may be other compound as long as such a compound has the structure shown in Chemical formula 5 to Chemical formula 7.

Chemical formula 8

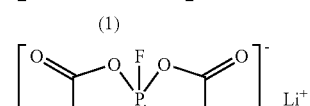

(1)

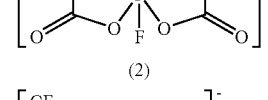

(2)

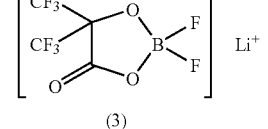

(3)

-continued

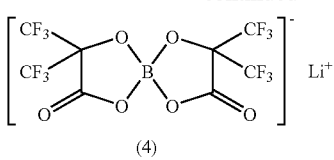
(4)

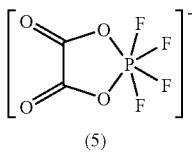
(5)

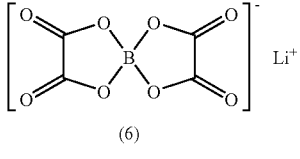
(6)

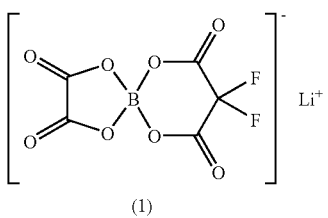
(1)

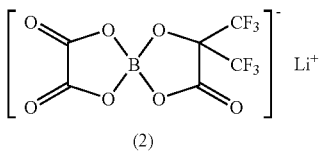
(2)

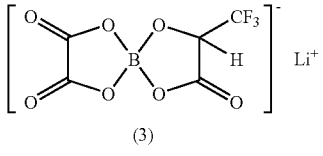
(3)

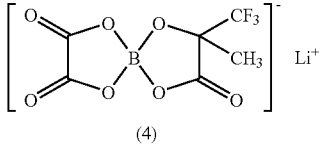
(4)

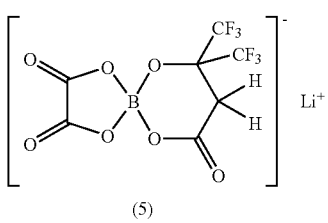
(5)

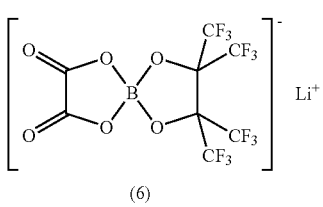
(6)

-continued

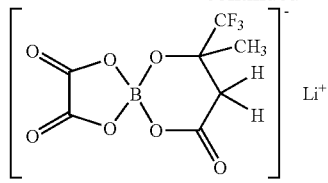
(7)

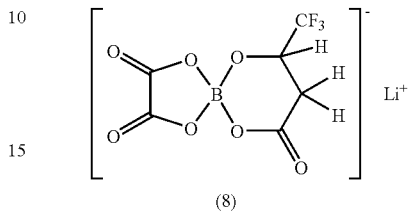
(8)

Chemical formula 9

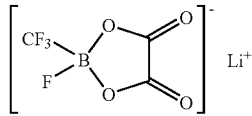

Chemical formula 10

The electrolyte salt may contain at least one selected from the group consisting of the compounds shown in Chemical formula 11 to Chemical formula 13. Thereby, when such a compound is used together with the foregoing lithium hexafluorophosphate or the like, higher effects are obtained. m and n in Chemical formula 11 may be identical or different. The same is applied to p, q, and r in Chemical formula 13.

$$LiN(C_mF_{2m+1}SO_2)(C_nF_{2n+1}SO_2) \quad \text{Chemical formula 11}$$

In the formula, m and n are an integer number of 1 or more.

Chemical formula 12

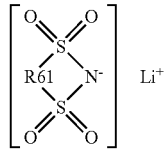

In the formula, R61 is a straight chain/branched perfluoro alkylene group with the carbon number in the range from 2 to 4.

$$LiC(C_pF_{2p+1}SO_2)(C_qF_{2q+1}SO_2)(C_rF_{2r+1}SO_2) \quad \text{Chemical formula 13}$$

In the formula, p, q, and r are an integer number of 1 or more.

As the chain compound shown in Chemical formula 11, for example, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl) (pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)) or the like is cited. One thereof may be used singly, or a plurality thereof may be used by mixture.

As the cyclic compound shown in Chemical formula 12, for example, the series of compounds shown in Chemical formulas 14-1 to 14-4 are cited. That is, lithium 1,2-perfluoroethanedisulfonylimide shown in Chemical formula 14(1), lithium 1,3-perfluoropropanedisulfonylimide shown in Chemical formula 14(2), lithium 1,3-perfluorobutanedisulfonylimide shown in Chemical formula 14(3), lithium 1,4-perfluorobutanedisulfonylimide shown in Chemical formula 14(4) or the like is cited. One thereof may be used singly, or a plurality thereof may be used by mixture.

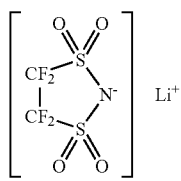

(1)

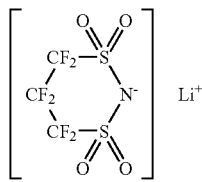

(2)

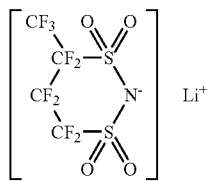

(3)

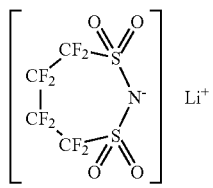

(4)

As the chain compound shown in Chemical formula 13, for example, lithium tris(trifluoromethanesulfonyl)methyde (LiC(CF$_3$SO$_2$)$_3$) or the like is cited.

The content of the electrolyte salt to the solvent is preferably in the range from 0.3 mol/kg to 3.0 mol/kg. If out of the foregoing range, there is a possibility that the ion conductivity is significantly lowered.

The secondary battery is manufactured, for example, by the following procedure.

First, the cathode 21 is formed. First, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by a doctor blade, a bar coater or the like, which is dried. Finally, the coating is compression-molded by a rolling press machine or the like while being heated if necessary to form the cathode active material layer 21B. In this case, the coating may be compression-molded over several times.

Further, the anode 22 is formed by forming the anode active material layer 22B on the both faces of the anode current collector 22A by the same procedure similar to that of forming the anode described above.

Next, the battery element 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between, and spirally wound in the longitudinal direction. Finally, a spirally wound body is shaped in the flat shape.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like, and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 2 to FIG. 4 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, the cycle characteristics can be improved. Effects of the secondary battery other than the foregoing effects are similar to those of the foregoing anode.

In particular, when the anode utilization ratio is in the range from 20% to 80%, and more preferably in the range from 30% to 70%, higher effects are obtained.

Second Battery

Figure 5:
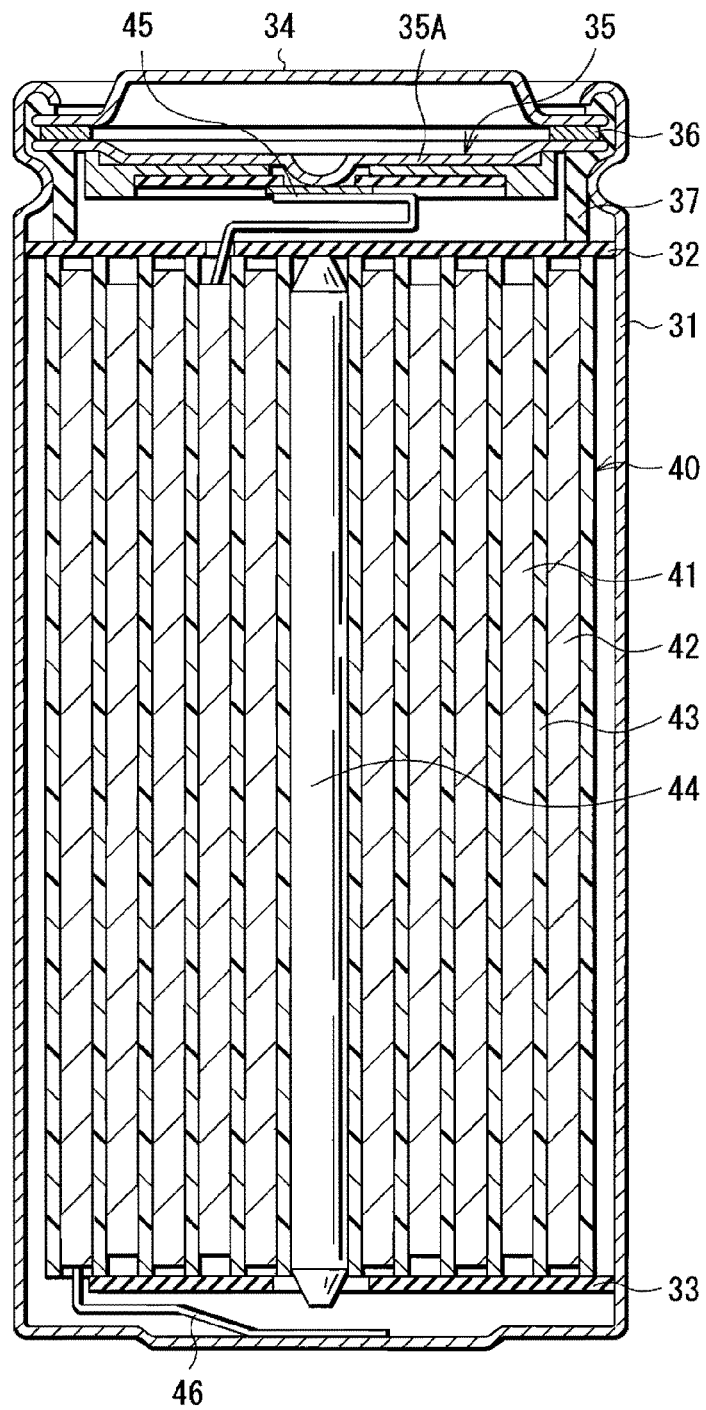
FIG. 5 is a cross section view showing a structure of a second battery including the anode according to the embodiment of the invention.
Figure 6:
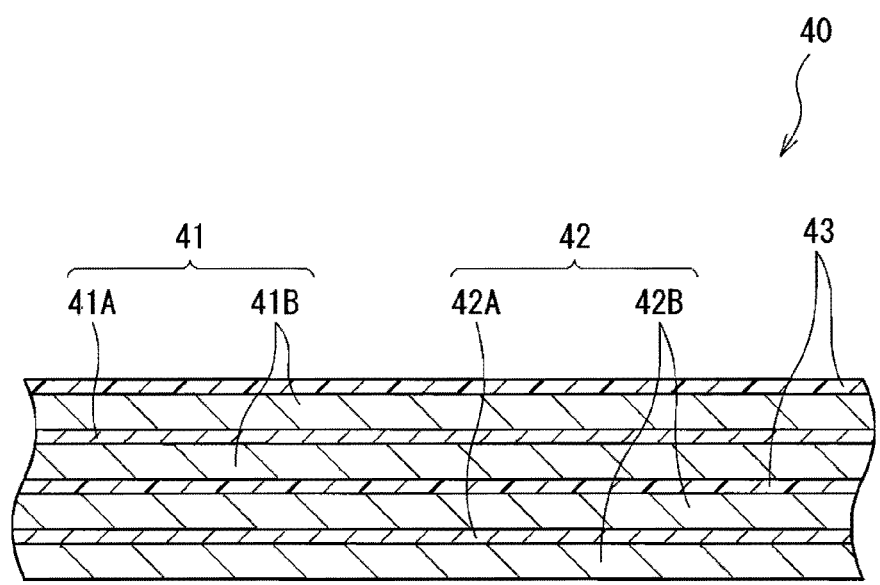
FIG. 6 is a cross section view showing an enlarged part of the spirally wound electrode body shown in FIG. 5.

FIG. 5 and FIG. 6 show a cross sectional structure of a second battery. FIG. 6 shows an enlarged part of a spirally wound electrode body 40 shown in FIG. 5. The battery is a lithium ion secondary battery as the foregoing first battery, for example. The battery mainly contains the spirally wound electrode body 40 in which a cathode 41 and the anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 with the PTC device 36 in between. In the safety valve mechanism 35, if the internal pressure becomes a certain level or more by internal short circuit, external heating or the like, a disk plate 35A flips to cut the electric connection between the battery cover 34 and the spirally wound electrode body 40. When temperature rises, the PTC device 36 increases the resistance and thereby limits a current to prevent abnormal heat generation resulting from a large current. The gasket 37 is made of, for example, an insulating material and its surface is coated with asphalt.

A center pin 44 may be inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the foregoing anode, for example, a structure in which an anode active material layer 42B is provided on the both faces of a strip-shaped anode current collector 42A. The structures of the cathode current collector 41A, the cathode active material layer 41B, the anode current collector 42A, the anode active material layer 42B, and the separator 43 and the composition of the electrolytic solution are respectively similar to the structures of the cathode current collector 21A, the cathode active material layer 21B, the anode current collector 22A, the anode active material layer 22B, and the separator 23 and the composition of the electrolytic solution in the foregoing first battery.

The secondary battery is manufactured, for example, as follows.

First, for example, the cathode 41 is formed by forming the cathode active material layer 41B on the both faces of the cathode current collector 41A and the anode 42 is formed by forming the anode active material layer 42B on the both faces of the anode current collector 42A by respective procedures similar to the procedures of forming the cathode 21 and the anode 22 in the foregoing first battery. Subsequently, the cathode lead 45 is attached to the cathode 41, and the anode lead 46 is attached to the anode 42. Subsequently, the cathode 41 and the anode 42 are layered and then spirally wound with the separator 43 in between, and thereby the spirally wound electrode body 40 is formed. The end of the cathode lead 45 is connected to the safety valve mechanism 35, and the end of the anode lead 46 is connected to the battery can 31. After that, the spirally wound electrode body 40 is sandwiched between the pair of insulating plates 32 and 33, and contained in the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 5 and FIG. 6 is thereby completed.

In the secondary battery, when charged, for example, lithium ions are extracted from the cathode 41 and inserted in the anode 42 through the electrolytic solution impregnated in the separator 43. Meanwhile, when discharged, for example, lithium ions are extracted from the anode 42, and inserted in the cathode 41 through the electrolytic solution impregnated in the separator 43.

According to the cylindrical secondary battery, the anode 42 has the structure similar to that of the foregoing anode. Thus, the cycle characteristics can be improved. Effects of the secondary battery other than the foregoing effects are similar to those of the first battery.

Third Battery

Figure 7:
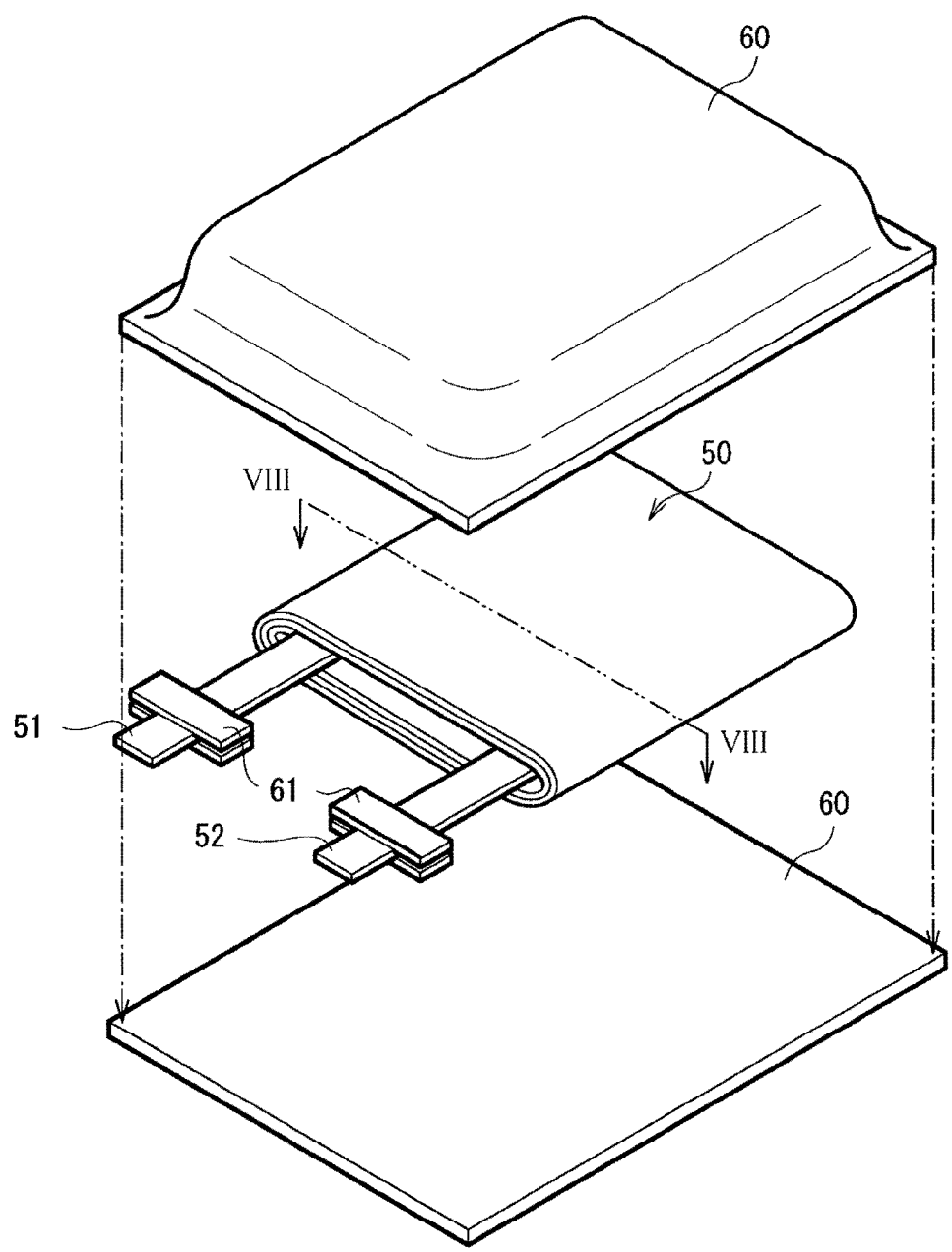
FIG. 7 is a cross section view showing a structure of a third battery including the anode according to the embodiment of the invention.
Figure 8:
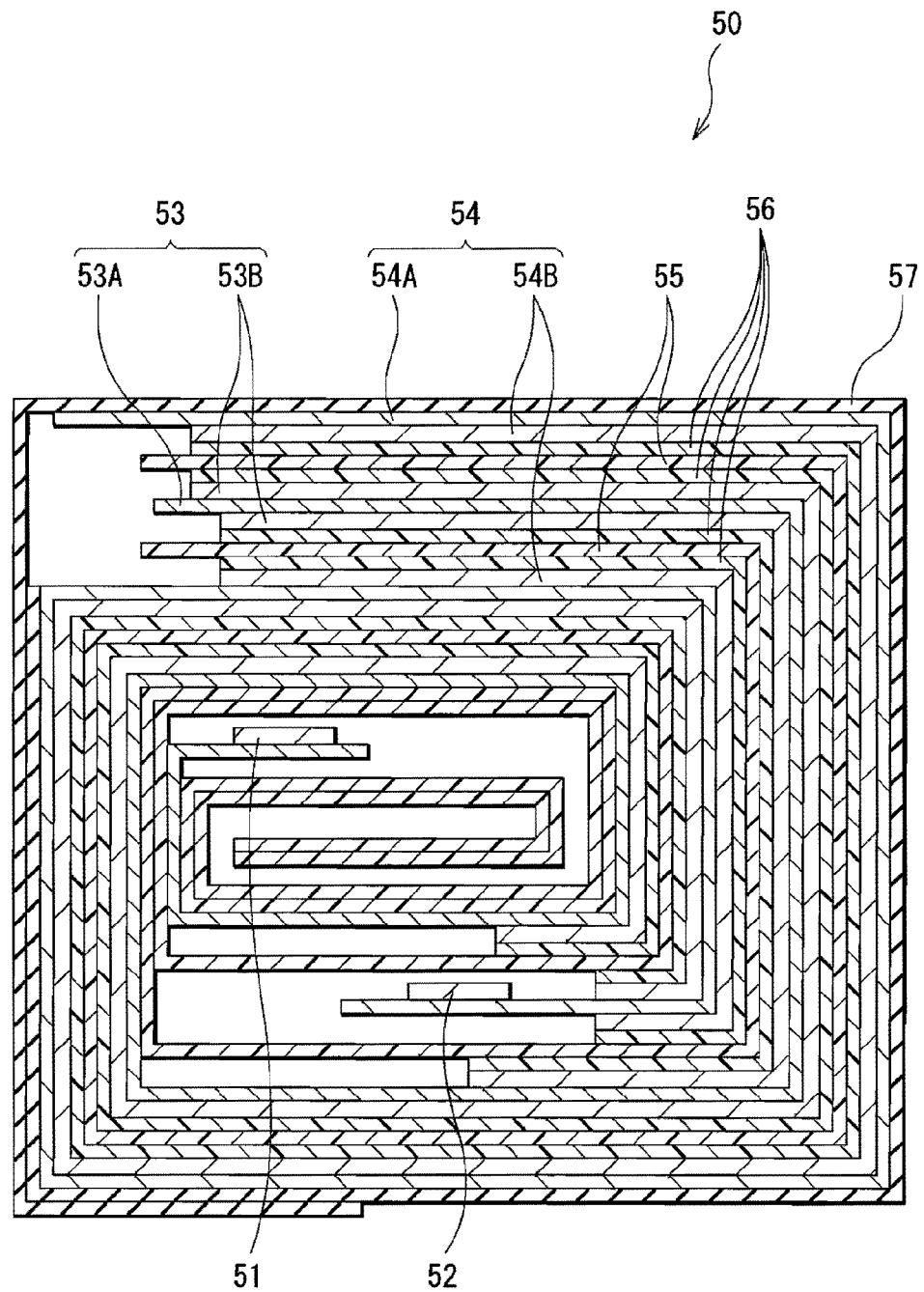
FIG. 8 is a cross section view taken along line XIII-XIII of the spirally wound electrode body shown in FIG. 7.

FIG. 7 shows an exploded perspective structure of a third battery. FIG. 8 shows a cross section taken along line VIII-VIII shown in FIG. 7. The battery is a lithium ion secondary battery as the foregoing first battery, for example. In the battery, a spirally wound electrode body 50 on which a cathode lead 51 and an anode lead 52 are attached is mainly contained in a film package member 60. The battery structure including the package member 60 is a so-called laminated film structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded to each other by fusion bonding or an adhesive so that the polyethylene film and the spirally wound electrode body 50 are opposed to each other.

An adhesive film 61 to protect from entering of outside air is inserted between the package member 60 and the cathode lead 51, the anode lead 52. The adhesive film 61 is made of a material having contact characteristics to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and then spirally wound. The outermost periphery thereof is protected by a protective tape 57.

The cathode 53 has a structure in which, for example, a cathode active material layer 53B is provided on the both faces of a strip-shaped cathode current collector 53A. The anode 54 has a structure similar to that of the foregoing anode, for example, has a structure in which an anode active material layer 54B is provided on the both faces of a strip-shaped anode current collector 54A. The structures of the cathode current collector 53A, the cathode active material layer 53B, the anode current collector 54A, the anode active material layer 54B, and the separator 55 are respectively similar to those of the cathode current collector 21A, the cathode active material layer 21B, the anode current collector 22A, the anode active material layer 22B, and the separator 23 of the foregoing first battery.

The electrolyte 56 is a so-called gel electrolyte, containing an electrolytic solution and a polymer compound that holds the electrolytic solution. The gel electrolyte is preferable, since thereby high ion conductivity (for example, 1 mS/cm or more at room temperature) is obtained and liquid leakage can be prevented.

As the polymer compound, for example, polyacrylonitrile, polyvinylidene fluoride, a copolymer of polyvinylidene fluoride and polyhexafluoropropylene, polytetrafluoro ethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like is cited. One of these polymer compounds may be used singly, or a plurality thereof may be used by mixture. Specially, polyacrylonitrile, polyvinylidene fluoride, polyhexafluoropropylene, polyethylene oxide or the like is preferably used, since such a compound is electrochemically stable.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three manufacturing methods.

In the first manufacturing method, first, for example, the cathode 53 is formed by forming the cathode active material layer 53B on the both faces of the cathode current collector 53A, and the anode 34 is formed by forming the anode active material layer 54B on the both faces of the anode current collector 54A by a procedure similar to that of the method of manufacturing the first battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is attached to the cathode 53, and the anode lead 52 is attached to the anode 54. Subsequently, the cathode 53 and the anode 54 provided with the electrolyte 56 are layered with the separator 55 in between to obtain a laminated body. After that, the laminated body is spirally wound in the longitudinal direction, the protective tape 57 is adhered to the outermost periphery thereof to form the spirally wound electrode body 50. Finally, for example, after the spirally wound electrode body 50 is sandwiched between 2 pieces of the film package members 60, outer edges of the package members 60 are contacted by thermal fusion bonding or the like to enclose the spirally wound electrode body 50. Then, the adhesive films 61 are inserted between the cathode lead 51, the anode lead 52 and the package member 60. Thereby, the secondary battery shown in FIG. 7 and FIG. 8 is completed.

In the second manufacturing method, first, the cathode lead 51 is welded to the cathode 53, and the anode lead 52 is welded to the anode 54. After that, the cathode 53 and the anode 54 are layered with the separator 55 in between and spirally wound. The protective tape 57 is adhered to the outermost periphery thereof, and thereby a spirally wound body as a precursor of the spirally wound electrode body 50 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In the third manufacturing method, the spirally wound body is formed and contained in the pouch-like package member 60 in the same manner as that of the foregoing second manufacturing method, except that the separator 55 with the both faces coated with a polymer compound is used firstly. As the polymer compound with which the separator 55 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be contained. Subsequently, an electrolytic solution is injected into the package member 60. After that, the opening of the package member 60 is sealed by thermal fusion bonding or the like. Finally, the resultant is heated while a weight is applied to the package member 60, and the separator 55 is contacted to the cathode 53 and the anode 54 with the polymer compound in between. Thereby, the electrolytic solution is impregnated into the polymer compound, and the polymer compound is gelated to form the electrolyte 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly left in the electrolyte 56 compared to the second manufacturing method, and the formation step of the polymer compound is favorably controlled. Thus, sufficient contact characteristics are obtained between the cathode 53/the anode 54/the separator 55 and the electrolyte 56.

According to the laminated film secondary battery, the anode 54 has the structure similar to that of the foregoing anode. Thus, the cycle characteristics can be improved. Effects of the secondary battery other than the foregoing effects are similar to those of the first battery.

EXAMPLES

Examples of the invention will be described in detail.

Example 1-1

The laminated film secondary battery shown in FIG. 7 and FIG. 8 was manufactured by the following procedure. Then, the secondary battery was manufactured as a lithium ion secondary battery in which the capacity of the anode 54 was expressed based on insertion and extraction of lithium.

First, the cathode 53 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry having a given viscosity. Finally, with the use of coating device, the both faces of the cathode current collector 53A made of a strip-shaped aluminum foil (thickness: 12 µm thick) were uniformly coated with the cathode mixture slurry, which was dried. After that, the resultant coating was compression-molded by a roll pressing machine to form the cathode active material layer 53B.

Next, the anode 54 was formed. First, silicon was deposited on the surface of an electrolytic copper foil (thickness: 15 µm) by electron beam evaporation method with the use of a deflective electron beam evaporation source, the electrolytic copper foil was dissolved and removed with the use of nitric acid, and a silicon film is left. After that, the silicon film was pulverized by ball mill to obtain silicon powder. Then, silicon with the purity of 99% was used as the evaporation source, and the pulverization time was adjusted so that the median size became 5 µm. To examine the median size, a particle size measurement device LA-920 manufactured by Horiba, Ltd. was used. Further, the substrate temperature and the deposition rate in depositing silicon were adjusted, and thereby the intensity ratio I1/I2 between the peak intensity I1 originated in (220) crystalline plane of silicon obtained by X-ray diffraction and the peak intensity I2 originated in (111) crystalline plane of silicon obtained by X-ray diffraction was set to 0.05. When the analysis by X-ray diffraction was performed, an X-ray diffracting device manufactured by Rigaku Co., was used. Then, CuKa was used as a tube, the tube voltage was 40 kV, the tube current was 40 mA, the scanning method was θ-2θ method, and the measurement range was 20 deg≤2θ≤90 deg. Subsequently, a polyamic acid solution including a solvent of N-methyl-2-pyrrolidone and N,N-dimethyl acetoamide was prepared. Subsequently, silicon powder as an anode active material and the polyamic acid solution as a precursor of an anode binder were mixed at a dry weight ratio of 80:20. After that, the resultant mixture was dispersed in N-methyl-2-pyrrolidone to obtain paste anode mixture slurry having a given viscosity. Subsequently, the both faces of the anode current collector 54A made of the electrolytic copper foil (thickness: 15 µm, arithmetic average roughness Ra: 0.2 µm) were uniformly coated with the anode mixture slurry in patterns by a coating device, and the resultant was dried. After that, the coating was compression-molded by a rolling press machine. Finally, the coating was provided with heat treatment in the vacuum atmosphere at 400 deg C. for 1 hour. Thereby, polyimide (PI) was generated as an anode binder, part of the polyimide was carbonized, and accordingly the anode active material layer 54B was formed. When the surface color (brightness L*) of the anode 54 viewed from the anode active material layer 54B side was examined, the brightness L* was 45. Further, in the measurement range of 20 deg≤2θ≤90 deg, when the intensity ratio A/B between the sum A of the peak intensity I1 originated in (220) crystalline plane of silicon and the peak intensity I2 originated in (111) crystalline plane of silicon, and the sum B of peak intensities originated in the other crystalline planes was examined, the intensity ratio A/B was 2. When the brightness L* was examined, a spectrophotometric colorimetry CD100 manufactured by Yokogawa Meters & Instruments Corporation was used. Further, when the intensity ratio A/B was examined, an X-ray diffracting device similar to that used when the intensity ratio I1/I2 was examined was used.

Next, after ethylene carbonate (EC) and diethyl carbonate (DEC) were mixed as a solvent, lithium hexafluorophosphate (LiPF$_6$) was dissolved therein as an electrolyte salt to prepare an electrolytic solution. Then, the composition of the solvent (EC:DEC) was 50:50 at a weight ratio. The concentration of the electrolyte salt in the electrolytic solution was 1 mol/kg.

Next, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the 3-layer separator 55 (thickness: 23 µm) in which a film made of a porous polyethylene as a main component was sandwiched between films made of porous polypropylene as a main component, the anode 54, and the foregoing separator 55 were layered in this order. The resultant laminated body was spirally wound in the longitudinal direction, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a 3-layer laminated film (total thickness: 100 µm) in which a nylon film (thickness: 30 µm), an aluminum foil (thickness: 40 µm), and a non-stretch polypropylene film (thickness 30 µm) were layered from the outside. After that, outer edges other than an edge of one side of the package members were thermally fusion-bonded to each other. Thereby, the spirally wound body was contained in the package members 60 in a pouched state. Subsequently, an electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film secondary battery was completed. In this case, the ratio between the capacity of the cathode 53 and the anode 54 was adjusted, and thereby the anode utilization ratio was set to 50%.

Examples 1-2 to 1-13

A procedure was performed in the same manner as that of Example 1-1, except that the intensity ratio I1/I2 was changed to 0.1 (Example 1-2), 0.2 (Example 1-3), 0.3 (Example 1-4), 0.4 (Example 1-5), 0.5 (Example 1-6), 0.6 (Example 1-7), 0.7 (Example 1-8), 0.8 (Example 1-9), 0.9 (Example 1-10), 1 (Example 1-11), 1.2 (Example 1-12), or 1.5 (Example 1-13) instead of 0.05. To change the intensity ratio I1/I2, the substrate temperature and the deposition rate when silicon was deposited were changed.

Comparative Examples 1-1 and 1-2

A procedure was performed in the same manner as that of Example 1-1, except that the intensity ratio I1/I2 was changed to 0.01 (Comparative example 1-1) or 0.03 (Comparative example 1-2) instead of 0.05.

Figure 9:
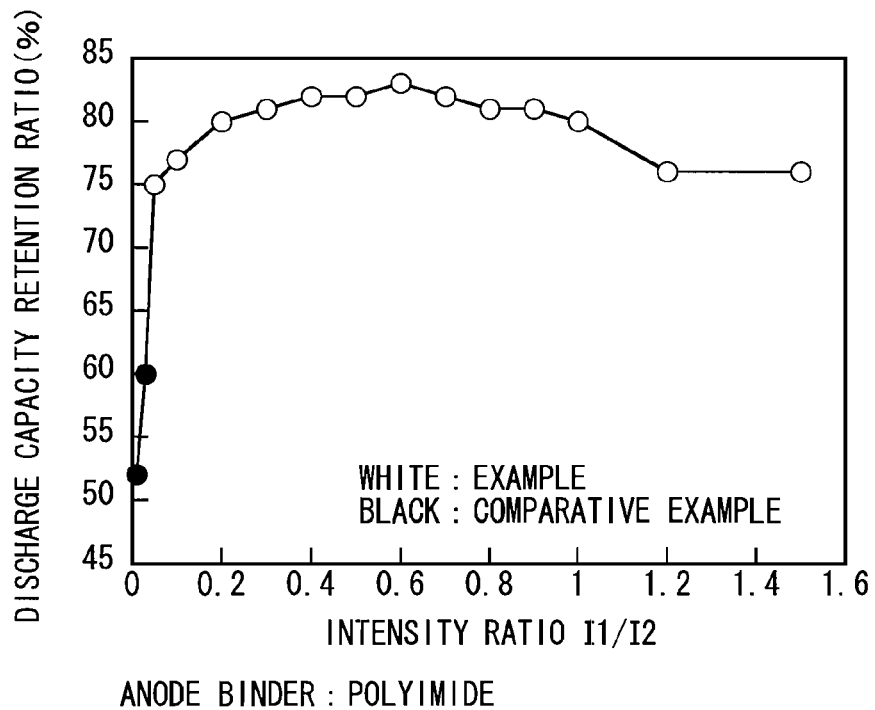
FIG. 9 is a diagram showing a correlation between an intensity ratio I1/I2 and a discharge capacity retention ratio (anode binder:polyimide)

When the cycle characteristics of the secondary batteries of Examples 1-1 to 1-13 and Comparative examples 1-1 and 1-2 were examined, the results shown in Table 1 and FIG. 9 were obtained.

In examining the cycle characteristics, to stabilize the battery state, charge and discharge were performed one cycle at 23 deg C. After that, charge and discharge were performed in the same atmosphere to measure the discharge capacity at the second cycle. Subsequently, the secondary battery was charged and discharged 99 cycles in the same atmosphere, and thereby the discharge capacity at the 101st cycle was measured. After that, the discharge capacity retention ratio (%)=(discharge capacity at the 101st cycle/discharge capacity at the second cycle)×100 was calculated. Then charge and discharge conditions in 1 cycle were as follows. Charge was performed at the constant current density of 3 mA/cm² until the battery voltage reached 4.2 V, and then charge was continuously performed at the constant voltage of 4.2 V until the current density reached 0.3 mA/cm². After that, discharge was performed at the constant current density of 3 mA/cm² until the battery voltage reached 2.5 V.

The procedure and the conditions for examining the cycle characteristics were similarly applied to the following series of examples and comparative examples.

TABLE 1

Arithmetic average roughness Ra: 0.2 μm
Anode utilization ratio: 50%

| | Anode active material layer | | | |
|---|---|---|---|---|
| | Anode active material | | Anode binder | Discharge capacity retention ratio (%) |
| | Intensity ratio I1/I2 | Median size (μm) | Type | Heat treatment temperature (deg C.) | |
| Example 1-1 | 0.05 | 5 | PI | 400 | 75 |
| Example 1-2 | 0.1 | | | | 77 |
| Example 1-3 | 0.2 | | | | 80 |
| Example 1-4 | 0.3 | | | | 81 |
| Example 1-5 | 0.4 | | | | 82 |
| Example 1-6 | 0.5 | | | | 82 |
| Example 1-7 | 0.6 | | | | 83 |
| Example 1-8 | 0.7 | | | | 82 |
| Example 1-9 | 0.8 | | | | 81 |
| Example 1-10 | 0.9 | | | | 81 |
| Example 1-11 | 1 | | | | 80 |
| Example 1-12 | 1.2 | | | | 76 |
| Example 1-13 | 1.5 | | | | 76 |
| Comparative example 1-1 | 0.01 | 5 | PI | 400 | 52 |
| Comparative example 1-2 | 0.03 | | | | 60 |

As shown in Table 1 and FIG. 9, in the case where polyimide was used as an anode binder, as the intensity ratio I1/I2 was larger, the discharge capacity retention ratio was drastically increased and then moderately decreased to become almost constant. In this case, when the intensity ratio I1/I2 was 0.05 or more, the discharge capacity retention ratio tended to be largely increased. When the intensity ratio I1/I2 was in the range from 0.2 to 1, the discharge capacity retention ratio tended to be more increased, and exceeded 80%.

The foregoing results showed the following. That is, when the intensity ratio I1/I2 is in the foregoing range, a stable crystalline plane (everywhere-dense plane) of silicon that favorably affects the discharge capacity retention ratio is obtained, and the crystalline state becomes appropriate. More specifically, if the intensity ratio I1/I2 is excessively small, the number of stable crystalline planes (everywhere-dense plane) of silicon is small. Thus, when lithium ions are inserted in the anode 54 in the initial charge, the lithium ions are localized in an unstable crystalline plane of silicon, and the anode 54 is easily reacted. Thereby, the electrolytic solution is easily decomposed, and the anode active material layer 54B is easily dropped. Meanwhile, if the intensity ratio I1/I2 is excessively large, the number of stable crystalline plane of silicon is large. Thus, the electrolytic solution is hardly decomposed, and the anode active material layer 54B is hardly dropped. However, when heat treatment is provided to promote plane growth, defects are easily generated in the anode active material, and thus the anode active material layer 54B is easily dropped.

Accordingly, it was confirmed that in the secondary battery of the invention, in the case where polyimide was used as an anode binder and the intensity ratio I1/I2 was 0.05 or more, the cycle characteristics were improved. In this case, it was also confirmed that when the intensity ratio I1/I2 was in the range from 0.2 to 1, the characteristics were further improved.

Examples 2-1 to 2-7

A procedure was performed in the same manner as that of Examples 1-1 to 1-4, 1-7, 1-11, and 1-12, except that a polyamide solution was used instead of the polyamic acid solution, and polyamide (PA) was generated as an anode binder.

Comparative Examples 2-1 and 2-2

A procedure was performed in the same manner as that of Comparative examples 1-1 and 1-2, except that polyamide was generated as an anode binder as in Examples 2-1 to 2-7.

Figure 10:
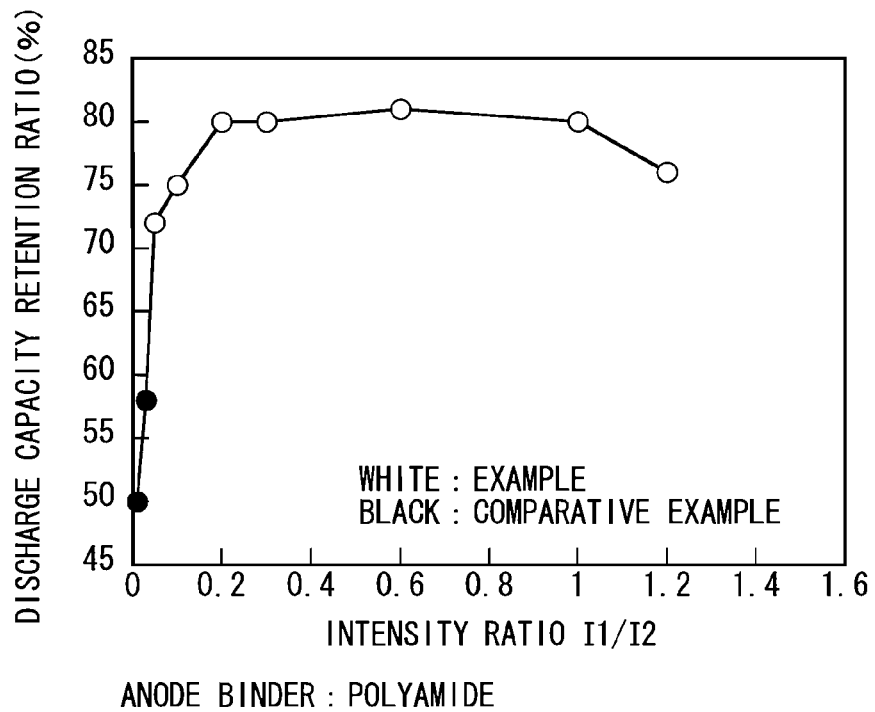
FIG. 10 is a diagram showing a correlation between an intensity ratio I1/I2 and a discharge capacity retention ratio (anode binder:polyamide)

When the cycle characteristics of the secondary batteries of Examples 2-1 to 2-7 and Comparative examples 2-1 and 2-2 were examined, the results shown in Table 2 and FIG. 10 were obtained.

TABLE 2

Arithmetic average roughness Ra: 0.2 μm
Anode utilization ratio: 50%

| | Anode active material layer | | | | |
|---|---|---|---|---|---|
| | Anode active material | | | Anode binder | Discharge capacity retention ratio (%) |
| | Intensity ratio I1/I2 | Median size (μm) | Type | Heat treatment temperature (deg C.) | |
| Example 2-1 | 0.05 | 5 | PA | 400 | 72 |
| Example 2-2 | 0.1 | | | | 75 |
| Example 2-3 | 0.2 | | | | 80 |
| Example 2-4 | 0.3 | | | | 80 |
| Example 2-5 | 0.6 | | | | 81 |
| Example 2-6 | 1 | | | | 80 |
| Example 2-7 | 1.2 | | | | 76 |
| Comparative example 2-1 | 0.01 | 5 | PA | 400 | 50 |
| Comparative example 2-2 | 0.03 | | | | 58 |

As shown in Table 2 and FIG. 10, in the case where polyamide was used as an anode binder, results almost similar to those in the case that polyimide was used (Table 1) were obtained as well. That is, as the intensity ratio I1/I2 was larger, the discharge capacity retention ratio was drastically increased and then moderately decreased. In this case, when the intensity ratio I1/I2 was 0.05 or more, the discharge capacity retention ratio tended to be largely increased. Further, when the intensity ratio I1/I2 was in the range from 0.2 to 1, the discharge capacity retention ratio tended to be more increased.

Accordingly, it was confirmed that in the secondary battery of the invention, in the case where polyamide was used as an anode binder and the intensity ratio I1/I2 was 0.05 or more, the cycle characteristics were improved as well. It was also confirmed that when the intensity ratio I1/I2 was in the range from 0.2 to 1, the characteristics were further improved.

Examples 3-1 to 3-7

A procedure was performed in the same manner as that of Examples 1-1 to 1-4, 1-7, 1-11, and 1-12, except that a polyamideimide solution was used instead of the polyamic acid solution, and polyamideimide (PAI) was generated as an anode binder.

Comparative Examples 3-1 and 3-2

A procedure was performed in the same manner as that of Comparative examples 1-1 and 1-2, except that polyamideimide was generated as an anode binder as in Examples 3-1 to 3-7.

Figure 11:
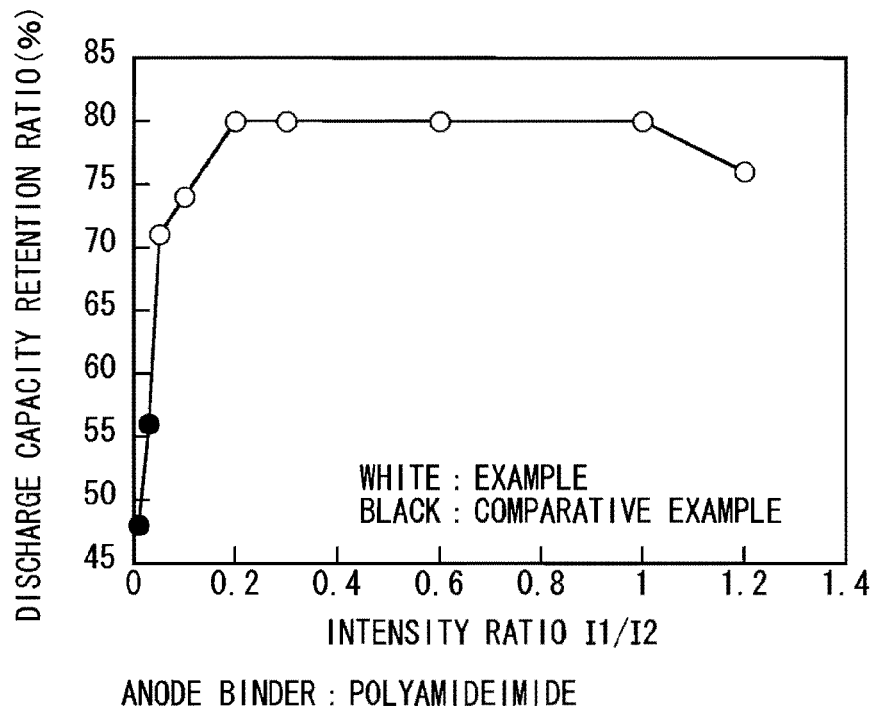
FIG. 11 is a diagram showing a correlation between an intensity ratio I1/I2 and a discharge capacity retention ratio (anode binder:polyamideimide)

When the cycle characteristics of the secondary batteries of Examples 3-1 to 3-7 and Comparative examples 3-1 and 3-2 were examined, the results shown in Table 3 and FIG. 11 were obtained.

TABLE 3

Arithmetic average roughness Ra: 0.2 μm
Anode utilization ratio: 50%

| | Anode active material layer | | | Discharge capacity retention ratio (%) |
|---|---|---|---|---|
| | Anode active material | | Anode binder | |
| | Intensity ratio I1/I2 | Median size (μm) | Type | treatment temperature (deg C.) |
| Example 3-1 | 0.05 | 5 | PAI | 400 | 71 |
| Example 3-2 | 0.1 | | | | 74 |
| Example 3-3 | 0.2 | | | | 80 |
| Example 3-4 | 0.3 | | | | 80 |
| Example 3-5 | 0.6 | | | | 80 |
| Example 3-6 | 1 | | | | 80 |
| Example 3-7 | 1.2 | | | | 76 |
| Comparative example 3-1 | 0.01 | 5 | PAI | 400 | 48 |
| Comparative example 3-2 | 0.03 | | | | 56 |

As shown in Table 3 and FIG. 11, in the case where polyamideimide was used as an anode binder, results almost similar to those in the case that polyimide was used (Table 1) were obtained as well. That is, as the intensity ratio I1/I2 was larger, the discharge capacity retention ratio was drastically increased and then moderately decreased. In this case, when the intensity ratio I1/I2 was 0.05 or more, the discharge capacity retention ratio tended to be largely increased. Further, when the intensity ratio I1/I2 was in the range from 0.2 to 1, the discharge capacity retention ratio tended to be more increased.

Accordingly, it was confirmed that in the secondary battery of the invention, in the case where polyamideimide was used as an anode binder and the intensity ratio I1/I2 was 0.05 or more, the cycle characteristics were improved as well. It was also confirmed that when the intensity ratio I1/I2 was in the range from 0.2 to 1, the characteristics were further improved.

Examples 4-1 to 4-8

A procedure was performed in the same manner as that of Examples 1-1 to 1-4, 1-7, 1-9, 1-11, and 1-12, except that polyvinylidene fluoride (PVDF) was used instead of polyimide as an anode binder.

Comparative Examples 4-1 and 4-2

A procedure was performed in the same manner as that of Comparative examples 1-1 and 1-2, except that polyvinylidene fluoride was used as an anode binder as in Examples 4-1 to 4-8.

Figure 12:
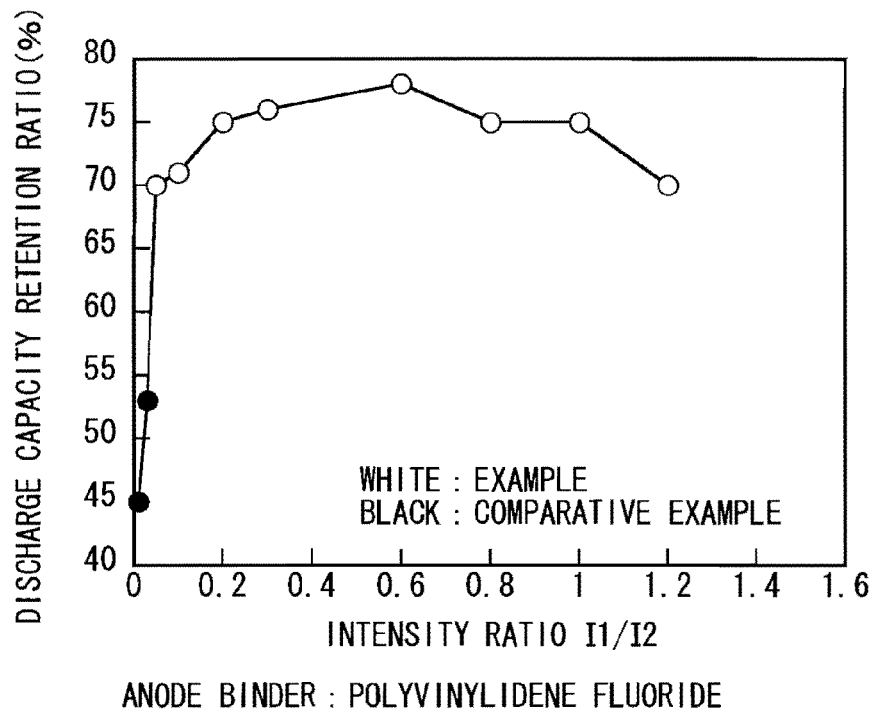
FIG. 12 is a diagram showing a correlation between an intensity ratio I1/I2 and a discharge capacity retention ratio (anode binder:polyvinylidene fluoride)

When the cycle characteristics of the secondary batteries of Examples 4-1 to 4-8 and Comparative examples 4-1 and 4-2 were examined, the results shown in Table 4 and FIG. 12 were obtained.

TABLE 4

Arithmetic average roughness Ra: 0.2 μm
Anode utilization ratio: 50%

| | Anode active material layer | | | Discharge capacity retention ratio (%) |
|---|---|---|---|---|
| | Anode active material | | Anode binder | |
| | Intensity ratio I1/I2 | Median size (μm) | Type | Heat treatment temperature (deg C.) |
| Example 4-1 | 0.05 | 5 | PVDF | 400 | 70 |
| Example 4-2 | 0.1 | | | | 71 |
| Example 4-3 | 0.2 | | | | 75 |
| Example 4-4 | 0.3 | | | | 76 |
| Example 4-5 | 0.6 | | | | 78 |
| Example 4-6 | 0.8 | | | | 75 |
| Example 4-7 | 1 | | | | 75 |
| Example 4-8 | 1.2 | | | | 70 |
| Comparative example 4-1 | 0.01 | 5 | PVDF | 400 | 45 |
| Comparative example 4-2 | 0.03 | | | | 53 |

As shown in Table 4 and FIG. 12, in the case where polyvinylidene fluoride was used as an anode binder, results almost similar to those in the case that polyimide was used (Table 1) were obtained as well. That is, as the intensity ratio I1/I2 was larger, the discharge capacity retention ratio was drastically increased and then moderately decreased. In this case, when the intensity ratio I1/I2 was 0.05 or more, the discharge capacity retention ratio tended to be largely increased. Further, when the intensity ratio I1/I2 was in the range from 0.2 to 1, the discharge capacity retention ratio tended to be more increased, exceeded 75%.

Accordingly, it was confirmed that in the secondary battery of the invention, in the case where polyvinylidene fluoride was used as an anode binder and the intensity ratio I1/I2 was 0.05 or more, the cycle characteristics were improved as well. It was also confirmed that when the intensity ratio I1/I2 was in the range from 0.2 to 1, the characteristics were further improved.

From the results of Table 1 to Table 4, focusing attention on difference of the anode binder types, in Examples 1-7, 2-5, and 3-5 in which polyimide, polyamide or polyamideimide was used, the discharge capacity retention ratio was higher than that of Example 4-5 in which polyvinylidene fluoride was used. Accordingly, it was confirmed that in the case where polyimide, polyamide, or polyamideimide was used as an anode binder, the cycle characteristics were further improved.

Examples 5-1 to 5-18

A procedure was performed in the same manner as that of Example 1-7, except that the median size of the anode active material was changed to 0.05 μm (Example 5-1), 0.08 μm (Example 5-2), 0.1 μm (Example 5-3), 0.3 μm (Example 5-4), 0.5 μm (Example 5-5), 1 μm (Example 5-6), 2 μm (Example 5-7), 3 μm (Example 5-8), 4 μm (Example 5-9), 8 μm (Example 5-10), 10 μm (Example 5-11), 13 μm (Example 5-12), 15 μm (Example 5-13), 20 μm (Example 5-14), 25 μm (Example 5-15), 30 μm (Example 5-16), 35 μm (Example 5-17), or 40 μm (Example 5-18) instead of 5 μm. To change the median size of the anode active material, pulverization time of the silicon film was changed.

Figure 13:
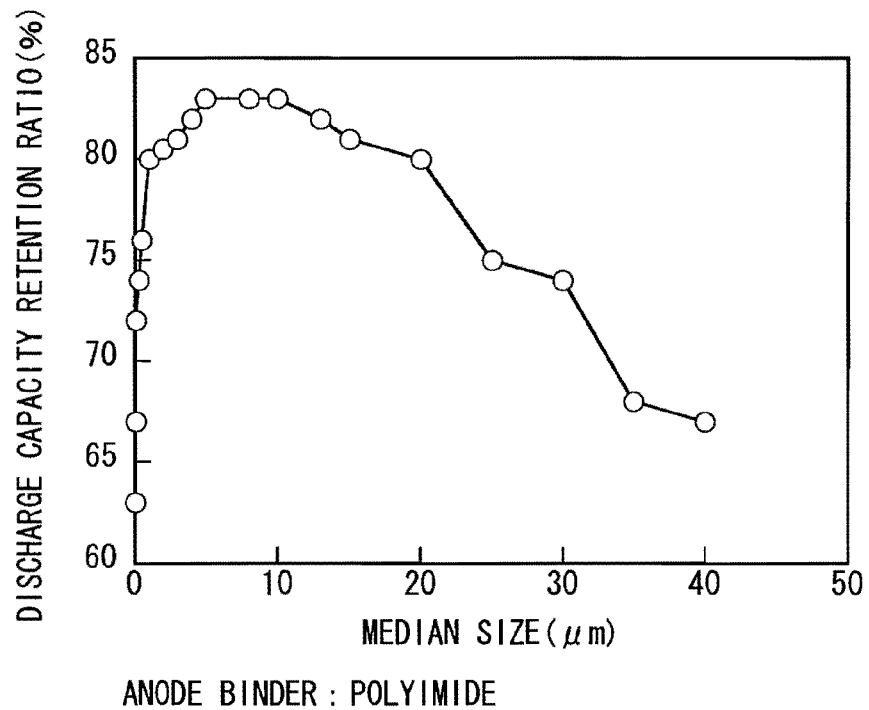
FIG. 13 is a diagram showing a correlation between a median size and a discharge capacity retention ratio (anode binder:polyimide)

When the cycle characteristics of the secondary batteries of Examples 5-1 to 5-18 were examined, the results shown in Table 5 and FIG. 13 were obtained.

TABLE 5

Arithmetic average roughness Ra: 0.2 μm
Anode utilization ratio: 50%

| | Anode active material | | Anode binder | Discharge capacity retention ratio (%) |
|---|---|---|---|---|
| | Intensity ratio I1/I2 | Median size (μm) | Type | Heat treatment temperature (deg C.) | |

| | Intensity ratio I1/I2 | Median size (μm) | Type | Heat treatment temperature (deg C.) | Discharge capacity retention ratio (%) |
|---|---|---|---|---|---|
| Example 5-1 | 0.6 | 0.05 | PI | 400 | 63 |
| Example 5-2 | | 0.08 | | | 67 |
| Example 5-3 | | 0.1 | | | 72 |
| Example 5-4 | | 0.3 | | | 74 |
| Example 5-5 | | 0.5 | | | 76 |
| Example 5-6 | | 1 | | | 80 |
| Example 5-7 | | 2 | | | 80.5 |
| Example 5-8 | | 3 | | | 81 |
| Example 5-9 | | 4 | | | 82 |
| Example 1-7 | | 5 | | | 83 |
| Example 5-10 | | 8 | | | 83 |
| Example 5-11 | | 10 | | | 83 |
| Example 5-12 | | 13 | | | 82 |
| Example 5-13 | | 15 | | | 81 |
| Example 5-14 | | 20 | | | 80 |
| Example 5-15 | | 25 | | | 75 |
| Example 5-16 | | 30 | | | 74 |
| Example 5-17 | | 35 | | | 68 |
| Example 5-18 | | 40 | | | 67 |

As shown in Table 5 and FIG. 13, as the median size was larger, the discharge capacity retention ratio was drastically increased and then moderately decreased. In this case, when the median size was in the range from 0.1 μm to 30 μm, the discharge capacity retention ratio tended to be high, exceeded 70%. Further, when the median size was in the range from 1 μm to 20 μm, the discharge capacity retention ratio tended to be higher, exceeded 80%.

The foregoing results showed the following. That is, when the median size is in the foregoing range, the particle diameter of the anode active material particles that favorably affects the discharge capacity retention ratio becomes appropriate. More specifically, if the median size is excessively small, the surface area of the anode active material becomes large, and thus the electrolytic solution is easily decomposed. Meanwhile, if the median size is excessively large, binding characteristics of the anode active material is lowered, and thus the anode active material layer 54B is easily dropped.

Accordingly, it was confirmed that in the secondary battery of the invention, when the median size of the anode active material was in the range from 0.1 μm to 30 μm, the cycle characteristics were further improved. Further, it was also confirmed that when the median size of the anode active material was in the range from 1 μm to 20 μm, the characteristics were even further improved.

Examples 6-1 to 6-5

A procedure was performed in the same manner as that of Example 1-7, except that the heat treatment temperature was changed to 500 deg C. (Example 6-1), 600 deg C. (Example 6-2), 700 deg C. (Example 6-3), 800 deg C (Example 6-4), or 900 deg C. (Example 6-5) instead of 400 deg C.

When the cycle characteristics of the secondary batteries of Examples 6-1 to 6-5 were examined, the results shown in Table 6 were obtained.

TABLE 6

Arithmetic average roughness Ra: 0.2 μm
Anode utilization ratio: 50%

| | Anode active material | | Anode binder | Discharge capacity retention ratio (%) |
|---|---|---|---|---|
| | Intensity ratio I1/I2 | Median size (μm) | Type | Heat treatment temperature (deg C.) | |

| | Intensity ratio I1/I2 | Median size (μm) | Type | Heat treatment temperature (deg C.) | Discharge capacity retention ratio (%) |
|---|---|---|---|---|---|
| Example 1-7 | 0.6 | 5 | PI | 400 | 83 |
| Example 6-1 | | | | 500 | 84 |
| Example 6-2 | | | | 600 | 85 |
| Example 6-3 | | | | 700 | 86 |
| Example 6-4 | | | | 800 | 87 |
| Example 6-5 | | | | 900 | 85 |

As shown in Table 6, as the heat treatment temperature became higher, the discharge capacity retention ratio was increased and then slightly decreased. In this case, when the heat treatment temperature was 800 deg C. or less, as the heat treatment temperature became higher, the discharge capacity retention ratio tended to be higher. The results show the following. That is, the kick-off temperature of polyimide used as an anode binder is about 500 deg C. Thus, when the heat treatment temperature is 400 deg C., carbonization degree of polyimide as an anode binder is increased, and accordingly the electric conductivity of the anode becomes high.

Accordingly, it was confirmed that in the secondary battery of the invention, when the heat treatment temperature was high, the cycle characteristics were further improved.

Examples 7-1 to 7-8

A procedure was performed in the same manner as that of Examples 1-4, 1-7, 1-9, and 1-12, except that a scale-like artificial graphite (median size: 5 μm in Examples 7-1 to 7-4) or carbon black (median size: 5 μm in Examples 7-5 to 7-8) was added into the anode active material layer 54B as an anode electrical binder. Then, the additive amount of the artificial graphite was 10 wt %, and the additive amount of the carbon black was 2 wt %. "10 wt %" means that where the total of the anode active material and the anode binder was 100 wt %, the amount of the anode electrical conductor corresponding to 10 wt % thereof was added. "2 wt %" has the same meaning.

When the cycle characteristics of the secondary batteries of Examples 7-1 to 7-8 were examined, the results shown in Table 7 were obtained.

TABLE 7

Arithmetic average roughness Ra: 0.2 μm
Anode utilization ratio: 50%

| | Anode active material | | Anode binder | | | Discharge capacity retention ratio (%) |
|---|---|---|---|---|---|---|
| | Intensity ratio I1/I2 | Median size (μm) | Type | Heat treatment temperature (deg C.) | Anode electrical conductor Type | |
| Example 1-4 | 0.3 | 5 | PI | 400 | — | 81 |
| Example 1-7 | 0.6 | | | | | 83 |
| Example 1-9 | 0.8 | | | | | 81 |
| Example 1-12 | 1.2 | | | | | 76 |
| Example 7-1 | 0.3 | 5 | PI | 400 | Artificial graphite | 83 |
| Example 7-2 | 0.6 | | | | | 85 |
| Example 7-3 | 0.8 | | | | | 83 |
| Example 7-4 | 1.2 | | | | | 78 |
| Example 7-5 | 0.3 | 5 | PI | 400 | Carbon black | 82 |
| Example 7-6 | 0.6 | | | | | 84 |
| Example 7-7 | 0.8 | | | | | 82 |
| Example 7-8 | 1.2 | | | | | 77 |

As shown in Table 7, in Examples 7-1 to 7-8 in which the artificial graphite or carbon black was added as an anode electrical conductor, the discharge capacity retention ratio was higher than that of Examples 1-4, 1-7, 1-9, and 1-12 in which the artificial graphite or carbon black was not added.

Accordingly, it was confirmed that in the secondary battery of the invention, when the anode electrical conductor was contained in the anode active material layer, the cycle characteristics were further improved.

Examples 8-1 to 8-4

A procedure was performed in the same manner as that of Example 1-7, except that the arithmetic average roughness Ra of the surface of the anode current collector 54A was changed to 0.05 μm (Example 8-1), 0.1 μm (Example 8-2), 0.3 μm (Example 8-3), or 0.4 μm (Example 8-4) instead of 0.2 μm.

Figure 14:
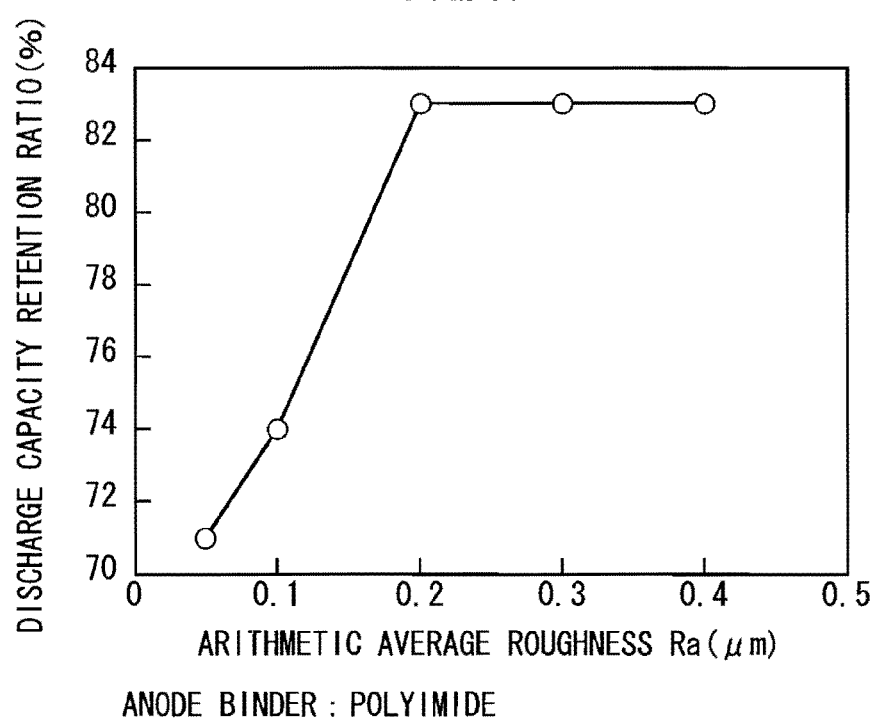
FIG. 14 is a diagram showing a correlation between an arithmetic average roughness Ra and a discharge capacity retention ratio (anode binder:polyimide)

When the cycle characteristics of the secondary batteries of Examples 8-1 to 8-4 were examined, the results shown in Table 8 and FIG. 14 were obtained.

TABLE 8

Anode utilization ratio: 50%

| | Anode current collector | Anode active material layer | | | Anode binder | Discharge capacity retention ratio (%) |
|---|---|---|---|---|---|---|
| | Arithmetic average roughness Ra (μm) | Intensity ratio I1/I2 | Median size (μm) | Type | Heat treatment temperature (deg C.) | |
| Example 8-1 | 0.05 | 0.6 | 5 | PI | 400 | 71 |
| Example 8-2 | 0.1 | | | | | 74 |
| Example 1-7 | 0.2 | | | | | 83 |
| Example 8-3 | 0.3 | | | | | 83 |
| Example 8-4 | 0.4 | | | | | 83 |

As shown in Table 8 and FIG. 14, when the arithmetic average roughness Ra was larger, the discharge capacity retention ratio was increased and then became constant. In this case, when the arithmetic average roughness Ra was 0.2 μm or more, the discharge capacity retention ratio tended to be largely increased.

Accordingly, it was confirmed that in the secondary battery of the invention, when the arithmetic average roughness Ra of the surface of the anode current collector was 0.2 μm or more, the cycle characteristics were further improved.

Examples 9-1 to 9-9

A procedure was performed in the same manner as that of Example 1-7, except that the anode utilization ratio was changed to 10% (Example 9-1), 20% (Example 9-2), 30% (Example 9-3), 40% (Example 9-4), 60% (Example 9-5), 70% (Example 9-6), 80% (Example 9-7), 90% (Example 9-8), or 100% (Example 9-9), instead of 50%. To change the anode utilization ratio, the ratio between the capacity of the cathode 53 and the capacity of the anode 54 was changed.

Figure 15:
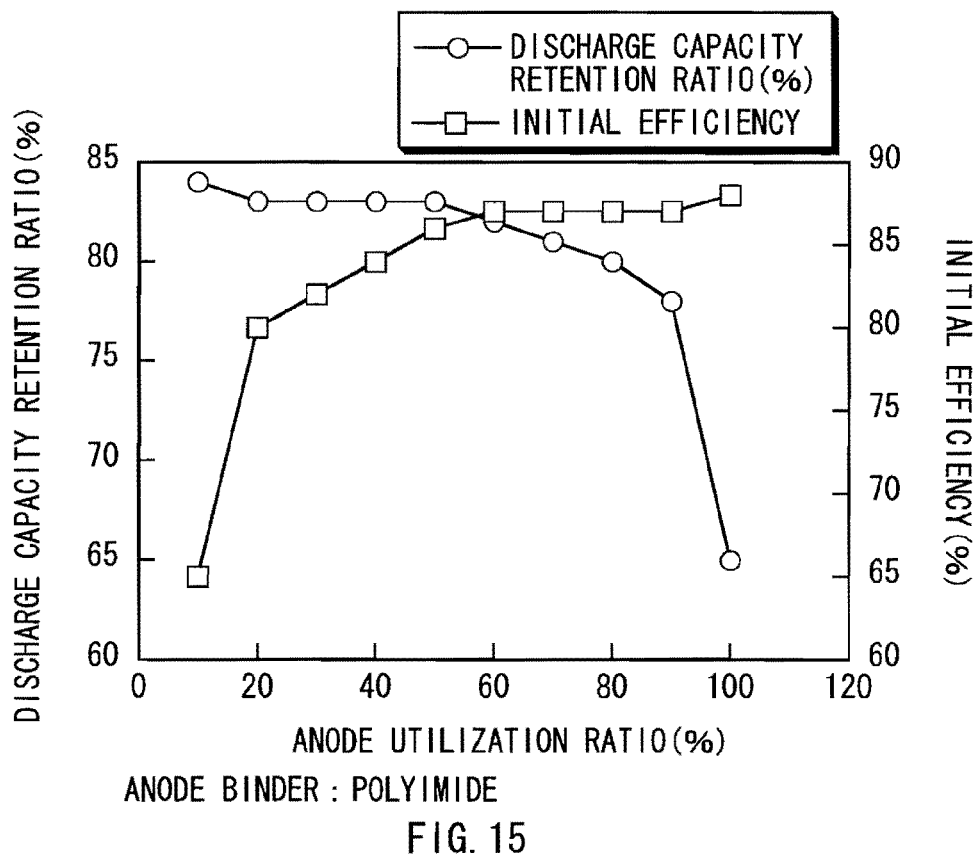
FIG. 15 is a diagram showing a correlation between an anode utilization ratio and a discharge capacity retention ratio/initial efficiency (anode binder:polyimide)

When the cycle characteristics of the secondary batteries of Examples 9-1 to 9-9 were examined, the results shown in Table 9 and FIG. 15 were obtained.

For the secondary batteries of Examples 9-1 to 9-9, the initial charge and discharge characteristics were examined in addition to the cycle characteristics. When the initial charge and discharge characteristics were examined, to stabilize the battery state, charge and discharge were performed one cycle at 23 deg C. After that, charge was performed in the same atmosphere to measure the charge capacity. Subsequently, the secondary battery was discharged in the same atmosphere to measure the discharge capacity. After that, the initial efficiency (%)=(discharge capacity/charge capacity)×100 was calculated. Then charge and discharge conditions were as follows. Constant voltage charge was performed at the constant current density of 1 mA/cm$^2$ until the current value reached 0.05 mA, and then discharge was performed at the constant current density of 1 mA/cm$^2$ until the battery voltage reached 1.5 V.

TABLE 9

Arithmetic average roughness Ra: 0.2 μm

| | Anode active material layer | | | | | |
|---|---|---|---|---|---|---|
| | Anode active material | | Anode binder | | | |
| | Intensity ratio I1/I2 | Median size (μm) | Type | Heat treatment temperature (deg C.) | Anode utilization ratio (%) | Discharge capacity retention ratio (%) | Initial efficiency (%) |
| Example 9-1 | 0.6 | 5 | PI | 400 | 10 | 84 | 65 |
| Example 9-2 | | | | | 20 | 83 | 80 |
| Example 9-3 | | | | | 30 | 83 | 82 |
| Example 9-4 | | | | | 40 | 83 | 84 |
| Example 1-7 | | | | | 50 | 83 | 86 |
| Example 9-5 | | | | | 60 | 82 | 87 |
| Example 9-6 | | | | | 70 | 81 | 87 |
| Example 9-7 | | | | | 80 | 80 | 87 |
| Example 9-8 | | | | | 90 | 78 | 87 |
| Example 9-9 | | | | | 100 | 65 | 88 |

As shown in Table 9 and FIG. 15, as the anode utilization ratio was higher, the discharge capacity retention ratio was moderately decreased and then drastically decreased. Meanwhile, as the anode utilization ratio was higher, the initial efficiency was drastically increased, and then moderately increased. In this case, when the anode utilization ratio was in the range from 20% to 80%, a high discharge capacity retention ratio and high initial efficiency tended to be obtained, both of which exceeded 80%. Further, when the anode utilization ratio was in the range from 30% to 70%, the discharge capacity retention ratio and the initial efficiency became higher.

Accordingly, it was confirmed that in the secondary battery of the invention, when the anode utilization ratio was in the range from 20% to 80%, favorable initial charge and discharge characteristics were obtained in addition to favorable cycle characteristics. In this case, it was confirmed that when the anode utilization ratio was in the range from 30% to 70%, the characteristics were further improved.

Example 10-1

A procedure was performed in the same manner as that of Example 1-7, except that 4-fluoro-1,3-dioxolane-2-one (FEC) as a cyclic ester carbonate having halogen shown in Chemical formula 2 was used instead of EC as a solvent.

Example 10-2

A procedure was performed in the same manner as that of Example 1-7, except that as an electrolyte salt, lithium tetrafluoroborate (LiBF$_4$) was added and sulfobenzoic acid anhydride (SBAH) was added as an acid anhydride. Then, while the concentration of the lithium hexafluoroborate in the electrolytic solution was kept 1 mol/kg, the concentration of lithium tetrafluoroborate in the electrolytic solution was set to 0.05 mol/kg. Further, the content of the SBAH in the solvent was set to 1 wt %. "1 wt %" means that where the entire solvent was 100 wt %, the amount of SBAH corresponding to 1 wt % thereof was added.

Example 10-3

A procedure was performed in the same manner as that of Example 10-2, except that propylene carbonate (PC) was added as a solvent. Then, the composition of the solvent (PC:FEC:DEC) was 20:30:50 at a weight ratio.

Example 10-4

A procedure was performed in the same manner as that of Example 10-3, except that 4-5-difluoro-1,3-dioxolane-2-one (DFEC) as a cyclic ester carbonate having halogen shown in Chemical formula 2 was added as a solvent. Then, the composition of the solvent (PC:FEC:DFEC:DEC) was 30:10:10:50 at a weight ratio.

Example 10-5

A procedure was performed in the same manner as that of Example 10-3, except that DFEC was added instead of FEC as a solvent. Then, the composition of the solvent (PC:DFEC:DEC) was 40:10:50 at a weight ratio.

When the cycle characteristics were examined for the secondary batteries of Examples 10-1 to 10-5, the results shown in Table 10 were obtained.

TABLE 10

Arithmetic average roughness Ra = 0.2 μm
Anode utilization ratio = 50%

| | Anode active material layer | | | | | | | | | | Discharge capacity retention ratio (%) |
|---|---|---|---|---|---|---|---|---|---|---|---|
| | Anode active material | | Anode binder | | Electrolytic solution | | | | | | |
| | Intensity ratio I1/I2 | Median size (μm) | Type | Heat treatment temperature (deg C.) | Solvent (wt %) | | | | | | |
| | | | | | EC | PC | FEC | DFEC | DEC | Electrolyte salt | Others |
| Example 1-7 | 0.6 | 5 | PI | 400 | 50 | — | — | — | 50 | LiPF$_6$ | — | 83 |
| Example 10-1 | | | | | — | — | 50 | — | 50 | LiPF$_6$ | — | 83.5 |
| Example 10-2 | | | | | — | — | 50 | — | 50 | LiPF$_6$ + LiBF$_4$ | SBAH | 84 |
| Example 10-3 | | | | | — | 20 | 30 | — | 50 | LiPF$_6$ + LiBF$_4$ | SBAH | 84.5 |
| Example 10-4 | | | | | — | 30 | 10 | 10 | 50 | LiPF$_6$ + LiBF$_4$ | SBAH | 85 |
| Example 10-5 | | | | | — | 40 | — | 10 | 50 | LiPF$_6$ + LiBF$_4$ | SBAH | 85.5 |

As shown in Table 10, in Examples 10-1 to 10-5 in which the electrolytic solution contained other solvent (FEC or the like), other electrolyte salt (lithium tetrafluoroborate), or acid anhydride (SBAH), the discharge capacity retention ratio was higher than that of Example 1-7 in which the electrolytic solution did not contain the foregoing substances. In this case, when the solvent contained DFEC, the discharge capacity retention ratio tended to be higher than that in the case in which the solvent contained FEC.

Accordingly, it was confirmed that in the secondary battery of the invention, the cycle characteristics were improved as well when the solvent composition and the electrolyte salt type were changed. It was also confirmed that when other solvent, other electrolyte, or the acid anhydride was added to the electrolytic solution, the cycle characteristics were further improved. Further, it was confirmed that when ester carbonate having halogen shown in Chemical formula 2 was contained in the solvent, the cycle characteristics were improved. In addition, it was confirmed that as the number of halogen was larger, the characteristics were further improved.

Results in the case that the solvent contained the chain ester carbonate having halogen shown in Chemical formula 1 are not herein shown. However, the chain ester carbonate having halogen shown in Chemical formula 1 has the same coat formation function as that of the cyclic ester carbonate having halogen shown in Chemical formula 2. Thus, it is evident that when the solvent contained the chain ester carbonate having halogen shown in Chemical formula 1, similar results are cited.

Examples 11-1 to 11-20

A procedure was performed in the same manner as that of Example 1-7, except that the surface color of the anode 54 (brightness L*) was 1 (Example 11(1)), 3 (Example 11(2)), 5 (Example 11(3)), 8 (Example 11(4)), 8.5 (Example 11(5)), 10 (Example 11(6)), 15 (Example 11(7)), 20 (Example 11(8)), 25 (Example 11(9)), 30 (Example 11(10)), 35 (Example 11(11)), 40 (Example 11(12)), 50 (Example 11(13)), 55 (Example 11(14)), 60 (Example 11(15)), 65 (Example 11(16)), 70 (Example 11(17)), 75.5 (Example 11(18)), 80 (Example 11(19)), or 82 (Example 11(20)) instead of 45. To change the brightness L*, the compression pressure (so-called pressure) when the anode active material layer 54B was formed was changed.

Figure 16:
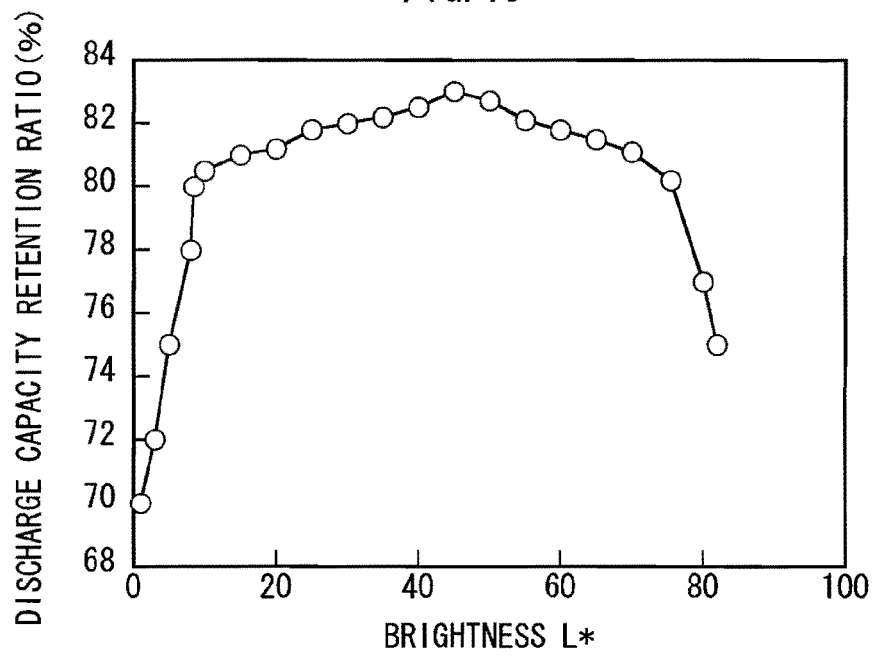
FIG. 16 is a diagram showing a correlation between a brightness L* and a discharge capacity retention ratio (anode binder:polyimide)

When the cycle characteristics of the secondary batteries of Examples 11(1) to 11(20) were examined, the results shown in Table 11 and FIG. 16 were obtained.

TABLE 11

Arithmetic average roughness Ra: 0.2 μm
Anode utilization ratio: 50%

| | Anode active material layer | | | | | | Discharge capacity retention ratio (%) |
|---|---|---|---|---|---|---|---|
| | Anode active material | | | Anode binder | | | |
| | Intensity ratio I1/I2 | Median size (μm) | Type | Heat treatment temperature (deg C.) | Brightness L* | Intensity ratio A/B | |
| Example 11-1 | 0.6 | 5 | PI | 400 | 1 | 2 | 70 |
| Example 11-2 | | | | | 3 | | 72 |
| Example 11-3 | | | | | 5 | | 75 |
| Example 11-4 | | | | | 8 | | 78 |
| Example 11-5 | | | | | 8.5 | | 80 |
| Example 11-6 | | | | | 10 | | 80.5 |
| Example 11-7 | | | | | 15 | | 81 |
| Example 11-8 | | | | | 20 | | 81.2 |
| Example 11-9 | | | | | 25 | | 81.8 |
| Example 11-10 | | | | | 30 | | 82 |
| Example 11-11 | | | | | 35 | | 82.2 |
| Example 11-12 | | | | | 40 | | 82.5 |

TABLE 11-continued

| | Arithmetic average roughness Ra: 0.2 μm Anode utilization ratio: 50% | | | | | | |
|---|---|---|---|---|---|---|---|
| | Anode active material layer | | | | | | Discharge capacity retention ratio (%) |
| | Anode active material | | Anode binder | | | | |
| | Intensity ratio I1/I2 | Median size (μm) | Type | Heat treatment temperature (deg C.) | Brightness L* | Intensity ratio A/B | |
| Example 1-7 | | | | | 45 | | 83 |
| Example 11-13 | | | | | 50 | | 82.7 |
| Example 11-14 | | | | | 55 | | 82.1 |
| Example 11-15 | | | | | 60 | | 81.8 |
| Example 11-16 | | | | | 65 | | 81.5 |
| Example 11-17 | | | | | 70 | | 81.1 |
| Example 11-18 | | | | | 75.5 | | 80.2 |
| Example 11-19 | | | | | 80 | | 77 |
| Example 11-20 | | | | | 82 | | 75 |

As shown in Table 11 and FIG. 16, in the case where polyimide was used as an anode binder, as the brightness L* was larger, the discharge capacity retention ratio was drastically increased and then moderately decreased. In this case, when the brightness L* was in the range from 8.5 to 75.5, the discharge capacity retention ratio tended to become high, and exceeded 80%. Further, when the brightness L* was in the range from 30 to 60, the discharge capacity retention ratio tended to become higher.

Accordingly, it was confirmed that in the secondary battery of the invention, when the surface color (brightness L*) of the anode 54 was in the range from 8.5 to 75.5, the cycle characteristics were further improved, and when the surface color (brightness L*) of the anode 54 was in the range from 30 to 60, the cycle characteristics were even further improved.

Examples 12-1 to 12-12

A procedure was performed in the same manner as that of Examples 11-1, 11-3 to 11-5, 11-8 to 11-10, 11-12, 11-15, 11-16, 11-18, and 11-19, except that the a polyamide solution was used instead of the polyamic acid solution, and polyamide was generated as an anode binder.

Figure 17:
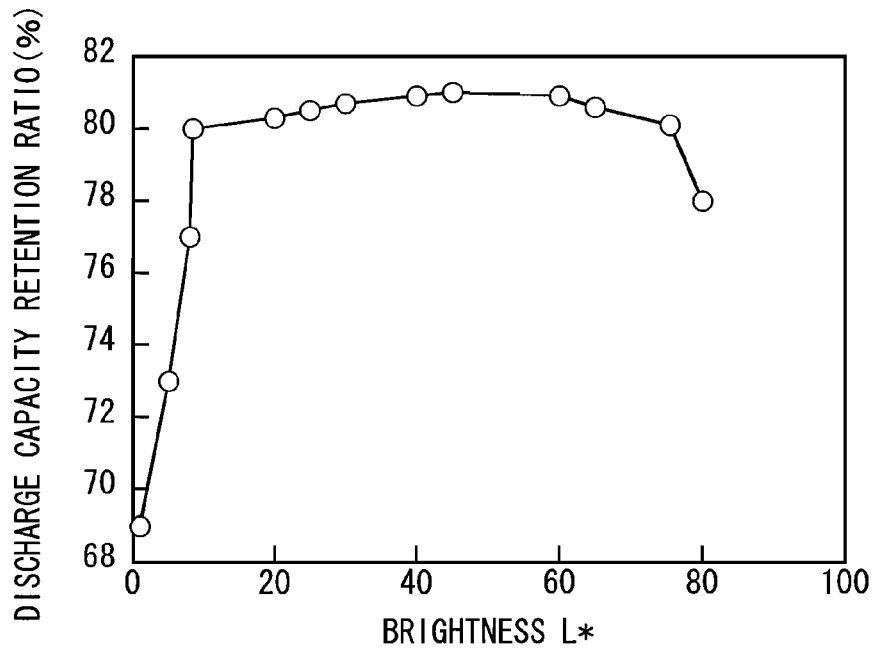
FIG. 17 is a diagram showing a correlation between a brightness L* and a discharge capacity retention ratio (anode binder:polyamide)

When the cycle characteristics of the secondary batteries of Examples 12-1 to 12-12 were examined, the results shown in Table 12 and FIG. 17 were obtained.

TABLE 12

| | Arithmetic average roughness Ra: 0.2 μm Anode utilization ratio: 50% | | | | | | |
|---|---|---|---|---|---|---|---|
| | Anode active material layer | | | | | | Discharge capacity retention ratio (%) |
| | Anode active material | | Anode binder | | | | |
| | Intensity ratio I1/I2 | Median size (μm) | Type | Heat treatment temperature (deg C.) | Brightness L* | Intensity ratio A/B | |
| Example 12-1 | 0.6 | 5 | PA | 400 | 1 | 2 | 69 |
| Example 12-2 | | | | | 5 | | 73 |
| Example 12-3 | | | | | 8 | | 77 |
| Example 12-4 | | | | | 8.5 | | 80 |
| Example 12-5 | | | | | 20 | | 80.3 |
| Example 12-6 | | | | | 25 | | 80.5 |
| Example 12-7 | | | | | 30 | | 80.7 |
| Example 12-8 | | | | | 40 | | 80.9 |
| Example 2-5 | | | | | 45 | | 81 |
| Example 12-9 | | | | | 60 | | 80.9 |
| Example 12-10 | | | | | 65 | | 80.6 |
| Example 12-11 | | | | | 75.5 | | 80.1 |
| Example 12-12 | | | | | 80 | | 78 |

As shown in Table 12 and FIG. 17, in the case where polyamide was used as an anode binder, results similar to those in the case of using polyimide (Table 11) were obtained. That is, as the brightness L* was larger, the discharge capacity retention ratio was drastically increased and then moderately decreased. In this case, when the brightness L* was in the range from 8.5 to 75.5, the discharge capacity retention ratio tended to become high, and when the brightness L* was in the range from 30 to 60, the discharge capacity retention ratio tended to become higher.

Accordingly, it was confirmed that in the secondary battery of the invention, when the brightness L* was in the range from 8.5 to 75.5, the cycle characteristics were further improved as well, and when the brightness L* was in the range from 30 to 60, the cycle characteristics were even further improved as well in the case that polyamide was used as an anode binder.

Examples 13-1 to 13-12

A procedure was performed in the same manner as that of Examples 11-1, 11-3 to 11-5, 11-8 to 11-10, 11-12, 11-15, 11-16, 11-18, and 11-19 except that a polyamideimide solution was used instead of the polyamic acid solution, and polyamideimide was generated as an anode binder.

Figure 18:
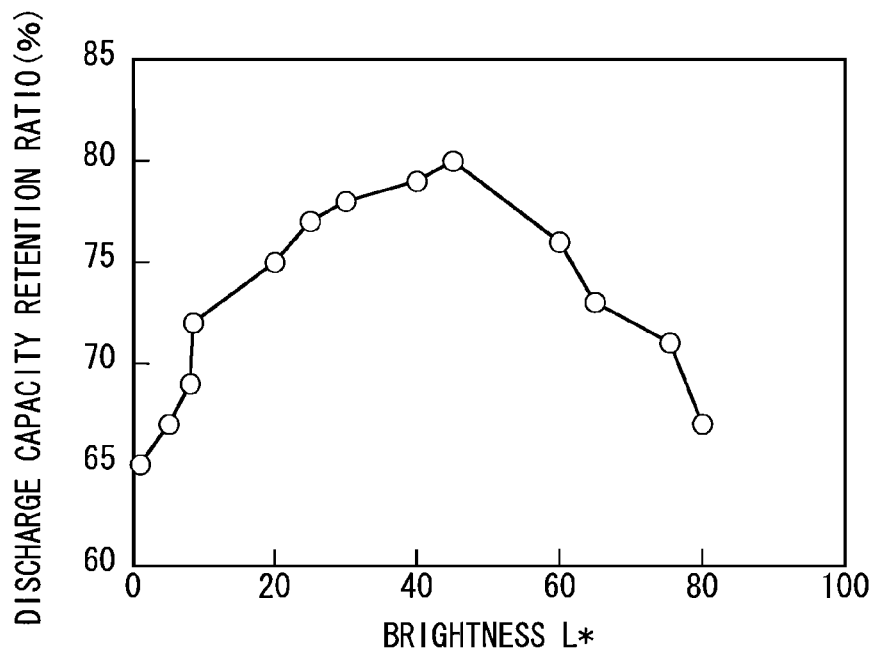
FIG. 18 is a diagram showing a correlation between a brightness L* and a discharge capacity retention ratio (anode binder:polyamideimide)

When the cycle characteristics of the secondary batteries of Examples 13-1 to 13-12 were examined, the results shown in Table 13 and FIG. 18 were obtained.

Accordingly, it was confirmed that in the secondary battery of the invention, when the brightness L* was in the range from 8.5 to 75.5, the cycle characteristics were further improved as well, and when the brightness L* was in the range from 30 to 60, the cycle characteristics were even further improved as well in the case that polyamideimide was used as an anode binder.

TABLE 13

Arithmetic average roughness Ra: 0.2 μm
Anode utilization ratio: 50%

| | Anode active material | | Anode active material layer | | | | Discharge capacity retention ratio (%) |
|---|---|---|---|---|---|---|---|
| | Intensity ratio I1/I2 | Median size (μm) | Anode binder Type | Heat treatment temperature (deg C.) | Brightness L* | Intensity ratio A/B | |
| Example 13-1 | 0.6 | 5 | PAI | 400 | 1 | 2 | 65 |
| Example 13-2 | | | | | 5 | | 67 |
| Example 13-3 | | | | | 8 | | 69 |
| Example 13-4 | | | | | 8.5 | | 72 |
| Example 13-5 | | | | | 20 | | 75 |
| Example 13-6 | | | | | 25 | | 77 |
| Example 13-7 | | | | | 30 | | 78 |
| Example 13-8 | | | | | 40 | | 79 |
| Example 3-5 | | | | | 45 | | 80 |
| Example 13-9 | | | | | 60 | | 76 |
| Example 13-10 | | | | | 65 | | 73 |
| Example 13-11 | | | | | 75.5 | | 71 |
| Example 13-12 | | | | | 80 | | 67 |

As shown in Table 13 and FIG. 18, when polyamideimide was used as an anode binder, results almost similar to those in the case that polyimide was used (Table 11) were obtained. That is, as the brightness L* was larger, the discharge capacity retention ratio was increased and then decreased. In this case, when the brightness L* was in the range from 8.5 to 75.5, the discharge capacity retention ratio tended to become high and exceeded 70%, and when the brightness L* was in the range from 30 to 60, the discharge capacity retention ratio tended to become higher.

Examples 14-1 to 14-13

A procedure was performed in the same manner as that of Examples 11-1, 11-3 to 11-5, 11-8 to 11-10, 11-12, 11-15, 11-16, 11-18, and 11-19, exept that polyvinylidene fluoride was used instead of polyimide as an anode binder.

Figure 19:
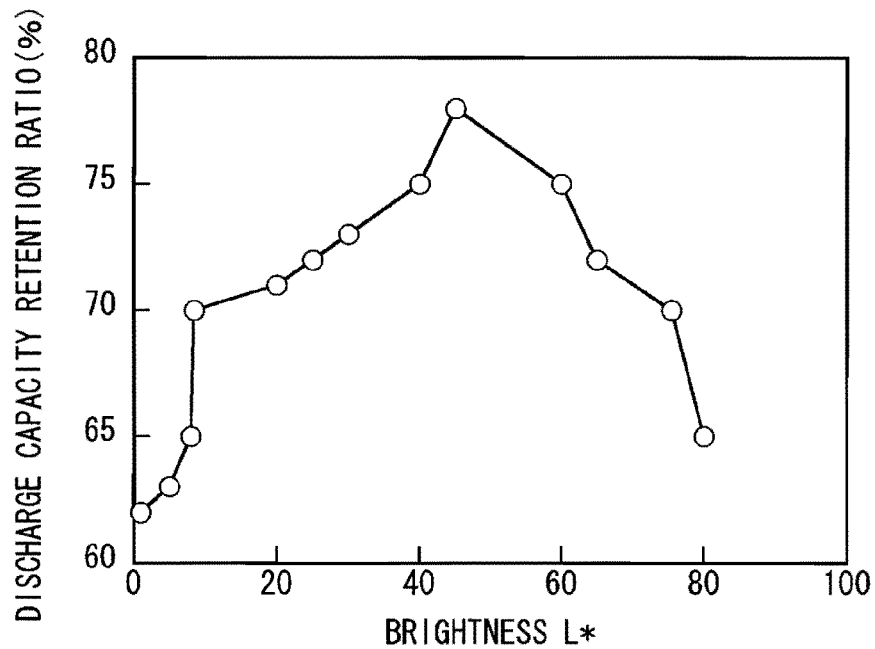
FIG. 19 is a diagram showing a correlation between a brightness L* and a discharge capacity retention ratio (anode binder:polyvinylidene fluoride)

When the cycle characteristics of the secondary batteries of Examples 14-1 to 14-13 were examined, the results shown in Table 14 and FIG. 19 were obtained.

TABLE 14

Arithmetic average roughness Ra: 0.2 μm
Anode utilization ratio: 50%

| | Anode active material | | Anode active material layer | | | | Discharge capacity retention ratio (%) |
|---|---|---|---|---|---|---|---|
| | Intensity ratio I1/I2 | Median size (μm) | Anode binder Type | Heat treatment temperature (deg C.) | Brightness L* | Intensity ratio A/B | |
| Example 14-1 | 0.6 | 5 | PVDF | 400 | 1 | 2 | 62 |
| Example 14-2 | | | | | 5 | | 63 |
| Example 14-3 | | | | | 8 | | 65 |
| Example 14-4 | | | | | 8.5 | | 70 |
| Example 14-5 | | | | | 20 | | 71 |
| Example 14-6 | | | | | 25 | | 72 |
| Example 14-7 | | | | | 30 | | 73 |
| Example 14-8 | | | | | 40 | | 75 |
| Example 4-5 | | | | | 45 | | 78 |
| Example 14-9 | | | | | 60 | | 75 |
| Example 14-10 | | | | | 65 | | 72 |
| Example 14-11 | | | | | 75.5 | | 70 |
| Example 14-12 | | | | | 80 | | 65 |

As shown in Table 14 and FIG. 19, in the case where polyvinylidene fluoride was used as an anode binder, results almost similar to those in the case that polyimide was used (Table 11) were obtained. That is, as the brightness L* was larger, the discharge capacity retention ratio was increased and then decreased. In this case, when the brightness L* was in the range from 8.5 to 75.5, the discharge capacity retention ratio tended to become high, and when the brightness L* was in the range from 30 to 60, the discharge capacity retention ratio tended to become higher.

Accordingly, it was confirmed that in the secondary battery of the invention, when the brightness L* was in the range from 8.5 to 75.5, the cycle characteristics were improved as well, and when the brightness L* was in the range from 30 to 60, the cycle characteristics were further improved as well in the case that polyvinylidene fluoride was used as an anode binder.

Examples 15-1 to 15-13

A procedure was performed in the same manner as that of Example 1-7, except that the intensity ratio A/B was 0.7 (Example 16-1), 0.8 (Example 15-2), 0.9 (Example 15-3), 1 (Example 15-4), 1.3 (Example 16-6), 1.5 (Example 15-6), 1.7 (Example 15-7), 3.2 (Example 15-8), 4 (Example 15-9), 5.3 (Example 15-10), 8 (Example 16-11), 16 (Example 15-12), or 32 (Example 15-13) instead of 2. To change the intensity ratio A/B, the substrate temperature and the deposition rate when silicon was deposited were changed in the same manner as in the case that the intensity ratio I1/I2 was changed.

Figure 20:
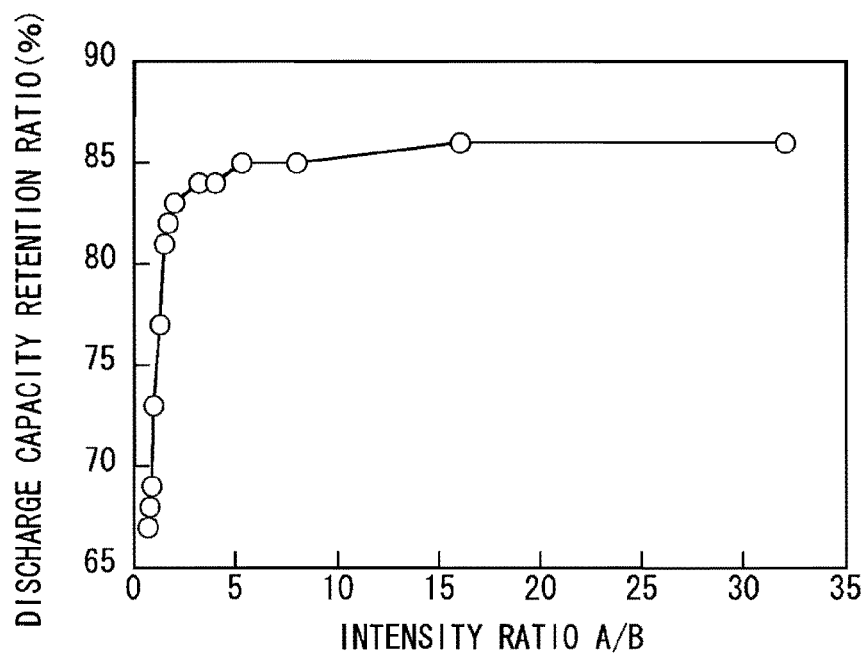
FIG. 20 is a diagram showing a correlation between an intensity ratio A/B and a discharge capacity retention ratio (anode binder:polyimide).

When the cycle characteristics of the secondary batteries of Examples 15-1 to 15-13 were examined, the results shown in Table 15 and FIG. 20 were obtained.

the cycle characteristics were further improved, and when the intensity ratio A/B was 1.5 or more, the cycle characteristics were further improved.

In Table 5 and the like, only the results when the median size of the anode active material and the like were changed in the case that polyimide was used as an anode binder have been shown. However, the median size and the like are determined without relation to the type of anode binder. Thus, it is evident that in the case where polyamide, polyamideimide, or polyvinylidene fluoride was used as an anode binder, similar results are obtained as well.

As evident by the results of the foregoing Table 1 to Table 15 and FIG. 9 to FIG. 20, in the secondary battery of the invention, it was confirmed that when the anode active material contained silicon, and the intensity ratio I1/I2 between the peak intensity I1 originated in (220) crystalline plane of silicon obtained by X-ray diffraction and the peak intensity I2 originated in (111) crystalline plane of silicon obtained by X-ray diffraction was set to 0.05 or more, the cycle characteristics were improved not depending on the type of the anode binder, presence of the anode electrical conductor, the composition of the electrolytic solution or the like.

The invention has been described with reference to the embodiment and the examples. However, the invention is not limited to the aspects described in the foregoing embodiment and the foregoing examples, and various modifications may be made. For example, the anode active material and the anode of the invention are not always used for the battery, but may be used for an electrochemical device other than the battery. As other use application, for example, a capacitor or the like is cited.

TABLE 15

Arithmetic average roughness Ra: 0.2 μm
Anode utilization ratio: 50%

| | Anode active material layer | | | | | Discharge capacity retention ratio (%) |
|---|---|---|---|---|---|---|
| | Anode active material | Anode binder | | | | |
| | Intensity ratio I1/I2 | Median size (μm) | Type | Heat treatment temperature (deg C.) | Brightness L* | Intensity ratio A/B |
| Example 15-1 | 0.6 | 5 | PI | 400 | 45 | 0.7 | 67 |
| Example 15-2 | | | | | | 0.8 | 68 |
| Example 15-3 | | | | | | 0.9 | 69 |
| Example 15-4 | | | | | | 1 | 73 |
| Example 15-5 | | | | | | 1.3 | 77 |
| Example 15-6 | | | | | | 1.5 | 81 |
| Example 15-7 | | | | | | 1.7 | 82 |
| Example 1-7 | | | | | | 2 | 83 |
| Example 15-8 | | | | | | 3.2 | 84 |
| Example 15-9 | | | | | | 4 | 84 |
| Example 15-10 | | | | | | 5.3 | 85 |
| Example 15-11 | | | | | | 8 | 85 |
| Example 15-12 | | | | | | 16 | 86 |
| Example 15-13 | | | | | | 32 | 86 |

As shown in Table 15 and FIG. 20, as the intensity ratio A/B was larger, the discharge capacity retention ratio was increased and then became constant. In this case, when the intensity ratio A/B was 1 or more, the discharge capacity retention ratio tended to be largely increased and exceeded 70%, and when the intensity ratio A/B was 1.5 or more, the discharge capacity retention ratio tended to be more increased and exceeded 80%.

Accordingly, it was confirmed that in the secondary battery of the invention, when the intensity ratio A/B was 1 or more, Further, in the foregoing embodiment and the foregoing examples, the descriptions have been given of the lithium ion secondary battery in which the anode capacity is expressed based on insertion and extraction of lithium as a battery type. However, the battery of the invention is not always limited thereto. The invention can be similarly applied to a secondary battery in which the anode capacity includes the capacity associated with insertion and extraction of lithium and the capacity associated with precipitation and dissolution of lithium, and the anode capacity is expressed as the sum of these capacities, by setting the charge capacity of the anode material capable of inserting and extracting lithium to a smaller value than that of the charge capacity of the cathode.

Further, in the foregoing embodiment and the foregoing examples, the description has been given with the specific examples of the square, cylindrical, or laminated film secondary battery as a battery structure, and with the specific example of the battery in which the battery element has the spirally wound structure. However, the invention can be similarly applied to a battery having other structure such as a coin type battery and a button type battery, or a battery in which the battery element has other structure such as a lamination structure.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In these cases, the anode material described in the foregoing embodiment is used as an anode active material as well.

Further, in the foregoing embodiment and the foregoing examples, regarding the intensity ratio I1/I2 of the anode active material, the anode, or the battery of the invention, the numerical value range thereof derived from the results of the examples has been described as the appropriate range. However, such a description does not totally eliminate the possibility that the intensity ratio I1/I2 may be out of the foregoing range. That is, the foregoing appropriate range is the range particularly preferable for obtaining the effects of the invention. Therefore, as long as effects of the invention are obtained, the intensity ratio I1/I2 may be out of the foregoing range in some degrees. The same is applied to the median size of the particles of the anode active material, the surface color of the anode (brightness: L*), the intensity ratio A/B or the like in addition to the intensity I1/I2 described above.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
an anode active material layer on an anode current collector comprising an electrolytic copper foil,
wherein,
the anode active material layer includes a plurality of anode active material particles including silicon in a crystalline state and at least one resin selected from the group consisting of polyimide, polyamide, and polyamideimide,
an intensity ratio I1/I2 between peak intensity I1 originated in a (220) crystalline plane of silicon obtained by X-ray diffraction and peak intensity I2 originated in a (111) crystalline plane of silicon obtained by X-ray diffraction is from 0.05 to 1.5, inclusive, and
at least part of the resin is carbonized.

2. The anode according to claim 1, wherein the intensity ratio I1/I2 is in the range from 0.2 to 1, inclusive.

3. The anode according to claim 1, wherein the median size of the anode active material particles is in the range from 1 μm to 30μm, inclusive.

4. The anode according to claim 1, wherein the anode active material layer contains a carbon material.

5. The anode according to claim 1, wherein an arithmetic average roughness Ra of a surface of the anode current collector is 0.2μm or more.

6. The anode according to claim 1, wherein a surface color of the anode is in the range from 8.5 to 75.5 in L* based on L*a*b* color coordinate system specified in Japanese Industrial Standard, JIS Z 8729.

7. The anode according to claim 6, wherein the surface color of the anode is in the range from 30 to 60 in the L* indication.

8. The anode according to claim 6, wherein an intensity ratio A/B is from 1 to 32, inclusive where a sum of the peak intensities I1 and I2 is A, and a sum of the peak intensities originated in the crystalline planes other than the (220) crystalline plane and the (111) crystalline plane of silicon is B, in a measurement range of 20 degrees ≤2θ ≤90 degrees.

9. The anode according to claim 8, wherein the intensity ratio A/B is from 1.5 to 32, inclusive.

10. A battery comprising:
a cathode;
an anode; and
an electrolytic solution,
wherein,
the anode has an anode active material layer that contains an anode active material on an anode current collector comprising an electrolytic copper foil,
the active material includes a plurality of anode active material particles including silicon in a crystalline state and at least one resin selected from the group consisting of polyimide, polyamide, and polyamideimide,
an intensity ratio I1/I2 between peak intensity I1 originated in a (220) crystalline plane of silicon obtained by X-ray diffraction and peak intensity I2 originated in a (111) crystalline plane of silicon obtained by X-ray diffraction is from 0.05 to 1.5, inclusive, and
at least part of the resin is carbonized.

11. The battery according to claim 10, wherein the intensity ratio I1/I2 is in the range from 0.2 to 1, inclusive.

12. The battery according to claim 10, wherein the median size of the particles is in the range from 1μm to 30μm, inclusive.

13. The battery according to claim 10, wherein the anode active material layer contains a carbon material.

14. The battery according to claim 10, wherein an arithmetic average roughness Ra of a surface of the anode current collector is 0.2 μm or more.

15. The anode according to claim 10, wherein a surface color of the anode is in the range from 8.5 to 75.5 in L* based on L*a*b* color coordinate system specified in Japanese Industrial Standard, JIS Z 8729.

16. The anode according to claim 15, wherein the surface color of the anode is in the range from 30 to 60 in the L* indication.

17. The anode according to claim 15, wherein an intensity ratio A/B is from 1 to 32, inclusive where a sum of the peak intensities I1 and I2 is A, and a sum of the peak intensities originated in the crystalline planes other than the (220) crystalline plane and the (111) crystalline plane of silicon is B, in a measurement range of 20 degrees =2θ =90 degrees.

18. The battery according to claim 17, wherein the intensity ratio A/B is from 1.5 to 32, inclusive.

19. The battery according to claim 10, wherein the electrolytic solution contains a solvent containing a cyclic ester carbonate having an unsaturated bond.

20. The battery according to claim 10, wherein the electrolytic solution contains a solvent containing at least one of a chain ester carbonate having halogen shown in Chemical formula 1 and a cyclic ester carbonate having halogen shown in Chemical formula 2, Chemical formulae 1-3 being:

Chemical formula 1

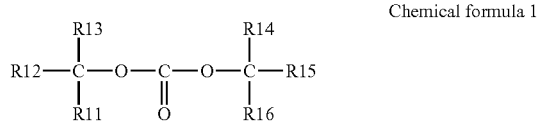

where each of R11 to R16 represent a hydrogen group, a halogen group, an alkyl group, or an alkyl halide group, and at least one of R11 to R16 is the halogen group or the alkyl halide group;

Chemical formula 2

where each of R21 to R24 represent a hydrogen group, a halogen group, an alkyl group, or an alkyl halide group and at least one of R21 to R24 is the halogen group or the alkyl halide group.

21. The battery according to claim 20, wherein the chain ester carbonate having halogen shown in Chemical formula 1 is at least one of fluoromethyl methyl carbonate, difluoromethyl methyl carbonate, and bis (fluoromethyl) carbonate, and the cyclic ester carbonate having halogen shown in Chemical formula 2 is at least one of 4-fluoro-1,3-dioxolane-2-one and 4,5-difluoro-1,3-dioxolane-2-one.

22. The battery according to claim 10, wherein the electrolytic solution contains a solvent containing sultone.

23. The battery according to claim 10, wherein the electrolytic solution contains a solvent containing an acid anhydride.

24. The battery according to claim 10, wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), and lithium hexafluoroarsenate ($LiAsF_6$).

25. The battery according to claim 10, wherein the electrolytic solution contains an electrolyte salt containing at least one selected from the group consisting of compounds shown in Chemical formula 3 to Chemical formula 5:

Chemical formula 3

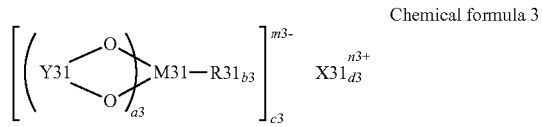

where X31 is a Group 1A element or a Group 2A element in the short period periodic table or aluminum (Al), M31 is a transition metal, a Group 3B element, a Group 4B element or a Group 5B element in the short period periodic table, R31 is a halogen group, Y31 is —OC—R32—CO—, —OC—CR33$_2$- or —OC—CO—, R32 is an alkylene group, an alkylene halide group, an arylene group or an arylene halide group, R33 is an alkyl group, an alkyl halide group, an aryl group or an aryl halide group, a3 is one of integer numbers 1 to 4, b3 is one of integer numbers 0, 2 and 4, and c3, d3, m3, and n3 is one of integer numbers 1 to 3;

Chemical formula 4

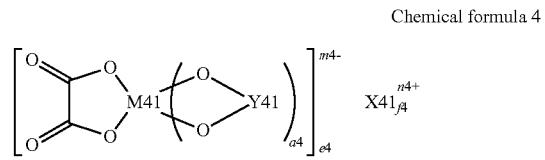

where X41 is a Group 1A element or a Group 2A element in the short period periodic table, M41 is a transition metal element, a Group 3B element, a Group 4B element or a Group 5B element in the short period periodic table, Y41 is —OC—(CR41$_2$)$_{b4}$—CO—, —R43$_2$C—(CR42$_2$)$_{c4}$—CO—, —R43$_2$C—(CR42$_2$)$_{c4}$—CR43$_2$-, —R43$_2$C—(CR42$_2$)$_{c4}$—SO$_2$—, —O$_2$S—CR42$_2$)$_{d4}$—SO$_2$— or —OC—(CR42$_2$)$_{d4}$—SO$_2$—, R41 and R43 are a hydrogen group, an alkyl group, a halogen group or an alkyl halide group, at least one of R41 and R43 is respectively the halogen group or the alkyl halide group, R42 is a hydrogen group, an alkyl group, a halogen group or an alkyl halide group, a4, e4, and n4 are an integer number of 1 or 2, b4 and d4 are one of integer numbers 1 to 4, c4 is one of integer numbers 0 to 4, and f4 and m4 are one of integer numbers 1 to 3;

Chemical formula 5

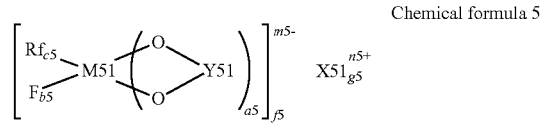

where X51 is a Group 1A element or a Group 2A element in the short period periodic table, M51 is a transition metal element, a Group 3B element, a Group 4B element or a Group 5B element in the short period periodic table, Rf is a fluorinated alkyl group with the carbon number in the range from 1 to 10 or a fluorinated aryl group with the carbon number in the range from 1 to 10, Y51 is —OC—(CR51$_2$)$_{d5}$—CO—, —R52$_2$C—(CR51$_2$)$_{d5}$—CO—, —R52$_2$C—(CR51$_2$)$_{d5}$—CR52$_2$-, —R52$_2$C—(CR51$_2$)$_{d5}$—SO$_2$—, —O$_2$S—(CR51$_2$)$_{e5}$—SO$_2$— or —OC—(CR51$_2$)$_{e5}$—SO$_2$—, R51 is a hydrogen group, an alkyl group, a halogen group or an alkyl halide group, R52 is a hydrogen group, an alkyl group, a halogen group or an alkyl halide group, and at least one thereof is the halogen group or the alkyl halide group, a5, f5, and n5 are an integer number of 1 or 2, b5, c5, and e5 are one of integer numbers 1 to 4, d5 is one of integer numbers 0 to 4, and g5 and m5 are one of integer numbers 1 to 3.

26. The battery according to claim 25, wherein the compound shown in Chemical formula 3 is at least one selected from the group consisting of compounds shown in Chemical formulas 6(1) to 6(6), the compound shown in Chemical formula 4 is at least one selected from the group consisting of compounds shown in Chemical formulas 7(1) to 7(8), and the compound shown in Chemical formula 5 is a compound shown in Chemical formula 8.

Chemical formula 6

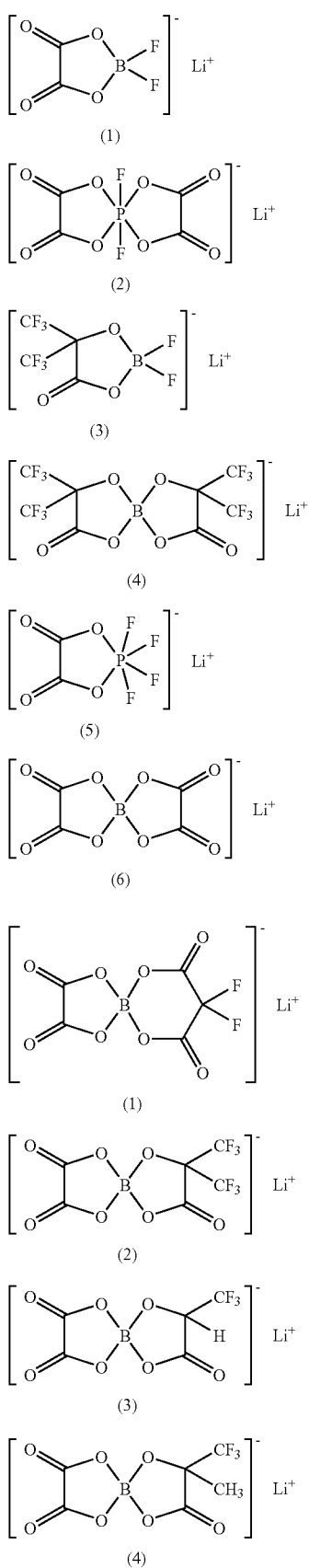

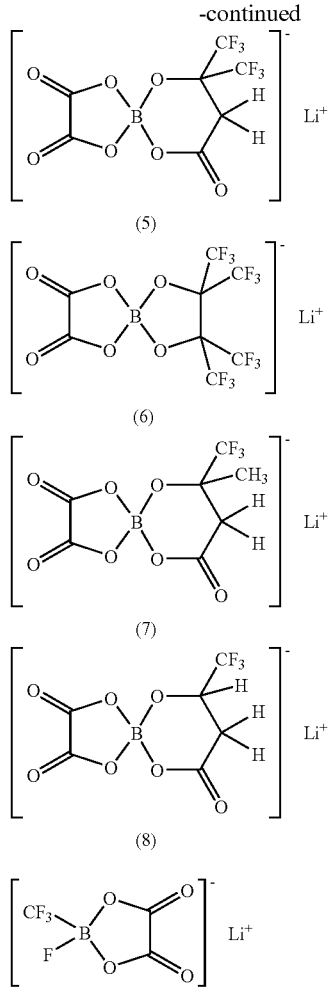

Chemical formula 7

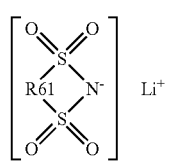

Chemical formula 8

27. The battery according to claim 10, wherein the electrolytic solution contains an electrolyte salt containing at least one selected from the group consisting of compounds shown in Chemical formula 9 to Chemical formula 11:

$$LiN(C_mF_{2m+1}SO_2)(C_nF_{2n+1}SO_2)$$ Chemical formula 9 where m and n are an integer number of 1 or more;

Chemical formula 10

$$\begin{bmatrix} O_{\diagdown}\mkern-6mu\diagup O \\ S \\ R61 \quad N^- \\ S \\ O^{\diagup}\mkern-6mu\diagdown O \end{bmatrix} Li^+$$

where R61 is a straight chain or branched perfluoro alkylene group with the carbon number in the range from 2 to 4;

$$LiC(C_pF_{2p+1}SO_2)(C_qF_{2q+1}SO_2)(C_rF_{2r+1}SO_2)$$ Chemical formula 11 where p, q, and r are an integer number of 1 or more.

28. The battery according to claim 10, wherein an anode utilization ratio when the anode is fully charged is in the range from and including 20% to 80%.

29. The anode according to claim 1 or 10 wherein the anode active material is heat treated at a temperature from 500 to 800 degrees Celsius, inclusive.

* * * * *